United States Patent [19]

Noji et al.

[11] Patent Number: 5,014,522

[45] Date of Patent: May 14, 1991

[54] AUTOMOTIVE AIR TEMPERING APPARATUS

[75] Inventors: Ikutaro Noji, Sagamihara; Masaki Kaiju, Hadano; Hideyuki Sakamoto, Sagamihara; Makoto Fukubayashi, Zama, all of

[73] Assignee: Nissan Motor Co., Ltd., Yokohama, Japan

[21] Appl. No.: 510,236

[22] Filed: Apr. 17, 1990

[30] Foreign Application Priority Data

Apr. 29, 1989 [JP] Japan ................................ 1-110577

[51] Int. Cl.$^5$ ...................... F25B 1/00; B60H 1/32
[52] U.S. Cl. ........................................ 82/227; 62/161; 62/180; 62/213; 62/228.5; 62/229
[58] Field of Search ............... 62/228.5, 180, 226, 62/227, 229, 228.1, 228.3, 228.4, 161, 162, 163, 164, 213, 208, 244; 236/49.3; 98/2.01; 165/25, 16, 41, 42, 43

[56] References Cited

U.S. PATENT DOCUMENTS

| | | | |
|---|---|---|---|
| 4,323,111 | 4/1982 | Iijima | 165/25 |
| 4,354,547 | 10/1982 | Sugiura | 165/25 |
| 4,428,718 | 1/1984 | Skinner | 417/222 |
| 4,471,632 | 9/1984 | Nishi et al. | 62/229 X |
| 4,646,535 | 3/1987 | Matsuoka et al. | 62/228.5 |
| 4,783,970 | 11/1988 | Takahashi | 62/176.3 |
| 4,894,999 | 1/1990 | Kaiju et al. | 62/161 X |
| 4,919,195 | 4/1990 | Tanino | 165/16 X |

FOREIGN PATENT DOCUMENTS

| | | |
|---|---|---|
| 0353764 | 2/1990 | European Pat. Off. . |
| 58-158382 | 9/1983 | Japan . |
| 0061624 | 3/1988 | Japan ............... 62/161 |

Primary Examiner—Harry B. Tanner
Attorney, Agent, or Firm—Foley & Lardner

[57] ABSTRACT

An automotive air tempering apparatus for use in an automotive vehicle having a duct through which air is directed into a passenger compartment. The apparatus comprises an air chilling unit including an evaporator provided in the duct and a compressor having a displacement variable for supplying a controlled amount of refrigerant to the evaporator for chilling the air in the duct. A control unit controls the displacement of the compressor to bring the refrigerant temperature to a target value when air is introduced into the duct from the atmosphere. The control unit controls the displacement of the compressor to bring the chilled air temperature to a target value when air is introduced into the duct from the passenger compartment.

3 Claims, 15 Drawing Sheets

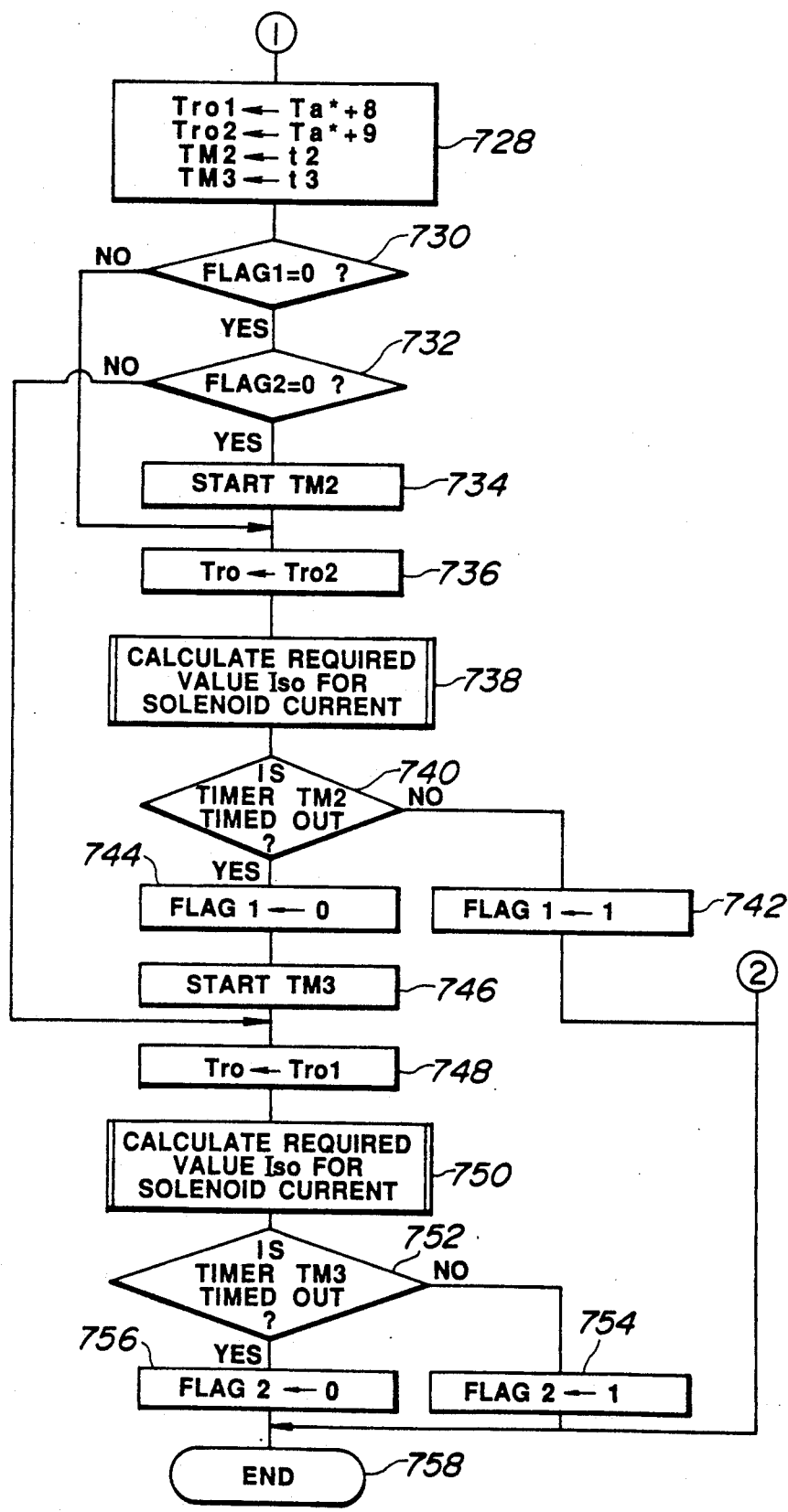

5,014,522

AUTOMOTIVE AIR TEMPERING APPARATUS

BACKGROUND OF THE INVENTION

This invention relates to an air tempering apparatus for use in an automotive vehicle having a duct through which air is directed into a passenger compartment.

Air tempering apparatus have sometimes utilized an air cooling heat exchanger for chilling air directed into a passenger compartment. The air cooling heat exchanger includes an evaporator having a variable refrigeration capacity. The evaporator is associated with a variable displacement compressor for supplying a refrigerant under pressure to the evaporator to adjust the refrigeration capacity of the evaporator. The compressor is controlled based upon ambient temperature and compartment temperature in such a manner as to have an increased displacement to increase the refrigeration capacity of the evaporator when the ambient temperature and/or the compartment temperature increases.

For example, U.S. Pat. application Ser. No. 388,444, filed Aug. 2, 1989, and entitled "Automotive Automatic Air Conditioning System with Variable Displacement Compressor" discloses an automotive air tempering apparatus operable in a low-temperature demist mode where the displacement or capacity of the compressor is controlled based upon a difference of an actual refrigerant temperature from a target refrigerant temperature changed at predetermined intervals of time between high and low values determined based upon the existing ambient temperature so as to dehumidity the passenger compartment to a sufficient degree even at low ambient temperatures.

The low-temperature demist mode continues until the ambient temperature decreases below a certain value. If the low-temperature demist mode continues for a long period of time, the evaporator would freeze. In addition, a refrigerant temperature sensor is provided at a position near the refrigerant inlet port of the evaporator to sense the actual refrigerant temperature. Thus, the refrigerant temperature sensor would be influenced by the warm air introduced into the duct from the passenger compartment to indicate an actual refrigerant temperature somewhat higher than the correct value. This results in a greater difference between the actual and target refrigerant temperatures, causing an unnecessary compressor displacement increase to freeze the evaporator.

SUMMARY OF THE INVENTION

It is, therefore, a main object of the invention to provide an improved air tempering apparatus which can provide a sufficient dehumidifying capacity even at low ambient temperatures without the possibility of the evaporator from freezing.

There is provided, in accordance with the invention, an air tempering apparatus for use in an automotive vehicle having a duct through which air is directed into a passenger compartment. The apparatus comprises means for introducing air into the duct selectively from one of the atmosphere and the passenger compartment, air chilling means including an evaporator provided in the duct and a compressor having a displacement variable for supplying a controlled amount of refrigerant to the evaporator for chilling the air in the duct, first sensor means provided in the duct downstream of the evaporator for sensing chilled air temperature, second sensor means for sensing refrigerant temperature, third sensor means for producing a first signal when air is introduced into the duct from the atmosphere and a second signal when air is introduced into the duct from the passenger compartment, and a control unit coupled to the first, second and third sensor means. The control unit includes means responsive to the first signal for controlling the displacement of the compressor to bring the refrigerant temperature to a target value, and means responsive to the second signal for controlling the displacement of the compressor to bring the chilled air temperature to a target value.

BRIEF DESCRIPTION OF THE DRAWINGS

This invention will be described in greater detail by reference to the following description taken in connection with the accompanying drawings, in which:

FIGS. 19A and 19B are flow diagrams of the programming of the digital computer as it is used to operate the compressor in a low-temperature demist mode;

DETAILED DESCRIPTION OF THE INVENTION

Figure 1:
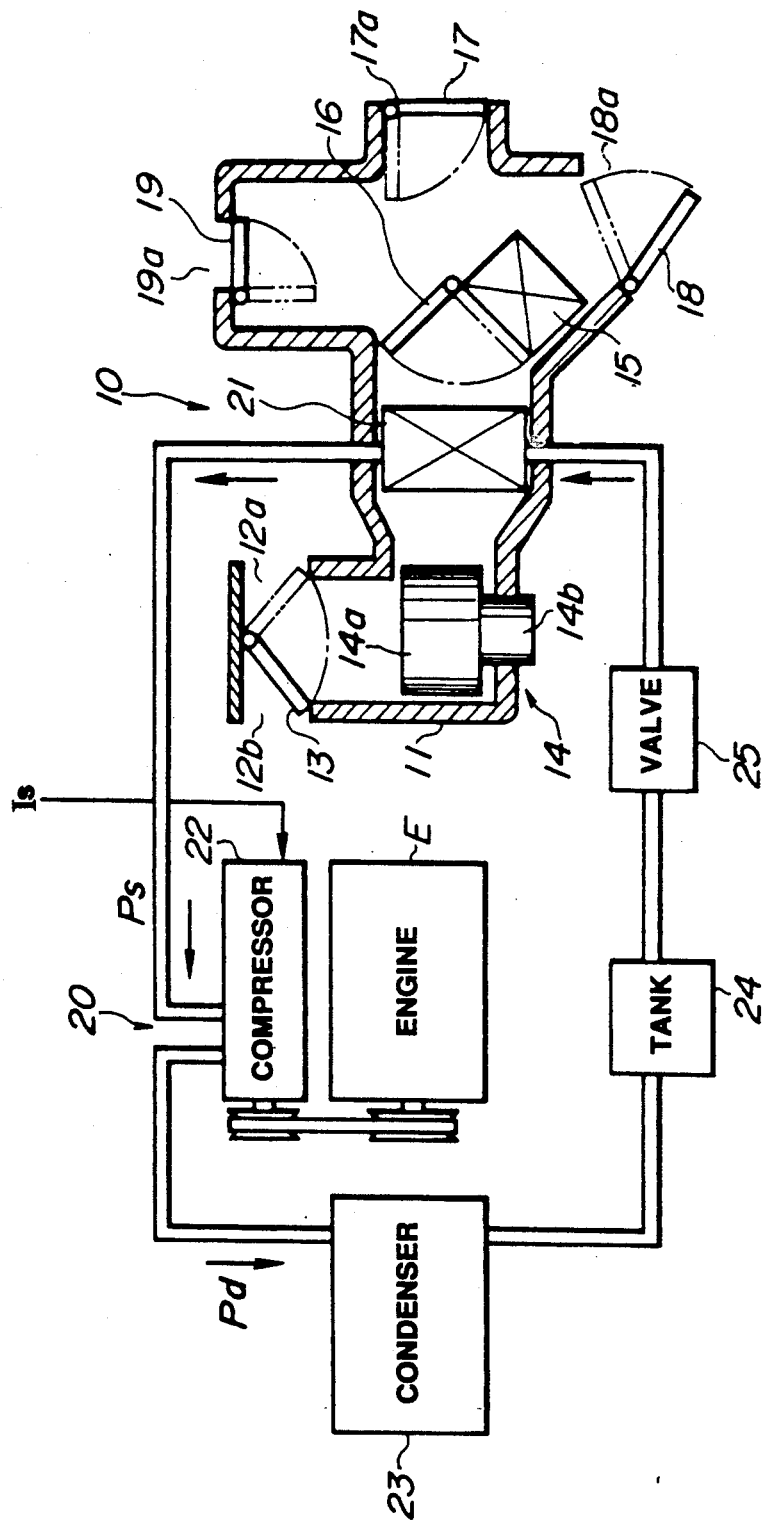
FIG. 1 is a schematic diagram of an air tempering apparatus embodying the invention.

With reference to the drawings, and in particular to FIG. 1, there is shown a schematic diagram of an air tempering system for use with an automotive vehicle vehicle. The air tempering system, generally designated by the numeral 10, includes an air duct 11 through which air is directed into the passenger compartment. The duct 11 has a first inlet port 12a opening to the atmosphere and a second inlet port 12b opening to the passenger compartment. An air intake door 13 is provided for movement between two positions. At the first position, shown by the solid lines, the air intake door 13 opens the first inlet port 12a and closes the second inlet port 12b. When the air intake door 13 is at the second position, shown by the two-dotted lines, it closes the first inlet port 12a and opens the second inlet port 12b. An air intake door actuator 111 (FIG. 6) is provided which operates on command from a control unit 100 (FIG. 6) to move the air intake door 13 between the first and second positions. The duct 11 contains a blower unit 14 having a blower 14a and a blower motor 14b which operates on command from a blower motor control circuit 117 (FIG. 6) for driving the blower motor 14b to produce a force flow of air through the duct 11.

The air tempering system 10 also includes an air chilling heat exchanger in the form of an evaporator 21 disposed in the duct 11, and an air heating heat exchanger in the form of a heater core 15 disposed in the duct 11. Air flowing through the duct 11 is chilled by the evaporator 21 after which the air may be reheated to a desired degree as it passes through the heater core 15 which carries a controlled amount of engine coolant from the engine cooling system. An air mixing door 16 is provided on the upstream side of the heater core 15 for controlling the air flow to the heater core 15. The air mixing door 16 is adjustably movable to proportion the chilled air to be reheated across the heater core 10 so as to control the final temperature of the air entering the passenger compartment. An air mixing door actuator 112 (FIG. 6) is provided which operates on command from the control unit 100 to move the air mixing door 16 at a desired angle.

The duct 11 has first, second and third outlet ports referred respectively to as a ventilator port 17a, a foot port 18a and a defroster port 19a. The ventilator port 17a is connected to a plurality of exit openings formed in the vehicle instrument panel facing to the passengers seated on the front seats. A vent door 17 is provided for movement between two positions. At the first position, shown by the solid lines, the vent door 17 closes the ventilator port 17a. When the vent door 17 is at the second position, shown by the two-dotted lines, it opens the ventilator port 17a. A vent door actuator 113 (FIG. 6) is provided which operates on command from the control unit 100 to move the vent door 17 between the first and second positions. The foot port 18a opens into the passenger compartment to direct the tempered air along the floor of the passenger compartment. A foot door 18 is provided for movement between two positions. At the first position, shown by the solid lines, the foot door 18 opens the foot port 18a. When the foot door 18 is at the second position, shown by the two-dotted lines, it closes the foot port 18a. A foot door actuator 114 (FIG. 6) is provided which operates on command from the control unit 100 to move the foot door 18 between the first and second positions. The defroster port 19a opens to defog the vehicle windshield in the presence of a specified condition. A defroster door 19 is provided for movement between two positions. At the first position, shown by the solid lines, the defroster door 19 closes the defroster port 19a. When the defroster door 19 is at the second position, shown by the two-dotted lines, it opens the defroster port 19a. A defroster door actuator 115 (FIG. 6) is provided which operates on command from the control unit 100 to move the defroster door 19 between the first and second positions. When the air tempering system is operating in a bilevel mode, the vent door 17 is in its second position opening the ventilator port 17a, the foot door 13 is in its first position opening the foot port 18a, and the defroster door 19 is in its first position closing the defroster port 19a. During a heater mode of operation of the air tempering system, the vent door 17 is in its first position closing the ventilator port 17a, the foot door 13 is in its first position opening the foot port 18a, and the defroster door 19 is in its second position opening the defroster port 19a. During a vent mode of operation of the air tempering system, the vent door 17 is in its second position opening the ventilator port 17a, the foot door 13 is in its second position closing the foot port 18a, and the defroster door 19 is in its first position closing the defroster port 19a.

The evaporator 21 forms a part of a compressor-condenser-evaporator refrigeration system 20 including a variable displacement refrigerant compressor 22, a condenser 23, a refrigerant tank 24 and an expansion valve 25 arranged in this order between the discharge and suction sides of the evaporator 21. The variable displacement refrigerant compressor 22 is of the variable angle wobble plate type responsive to compressor suction and discharge pressures Ps and Pd for controlling the compressor discharge flow rate. The compressor discharge flow rate increases to provide an increasing refrigerant capacity when the compressor suction pressure Ps exceeds a predetermined value Pr. This predetermined value Pr is determined by a solenoid current Is applied to the compressor 22 from the control unit 100.

Figure 2:
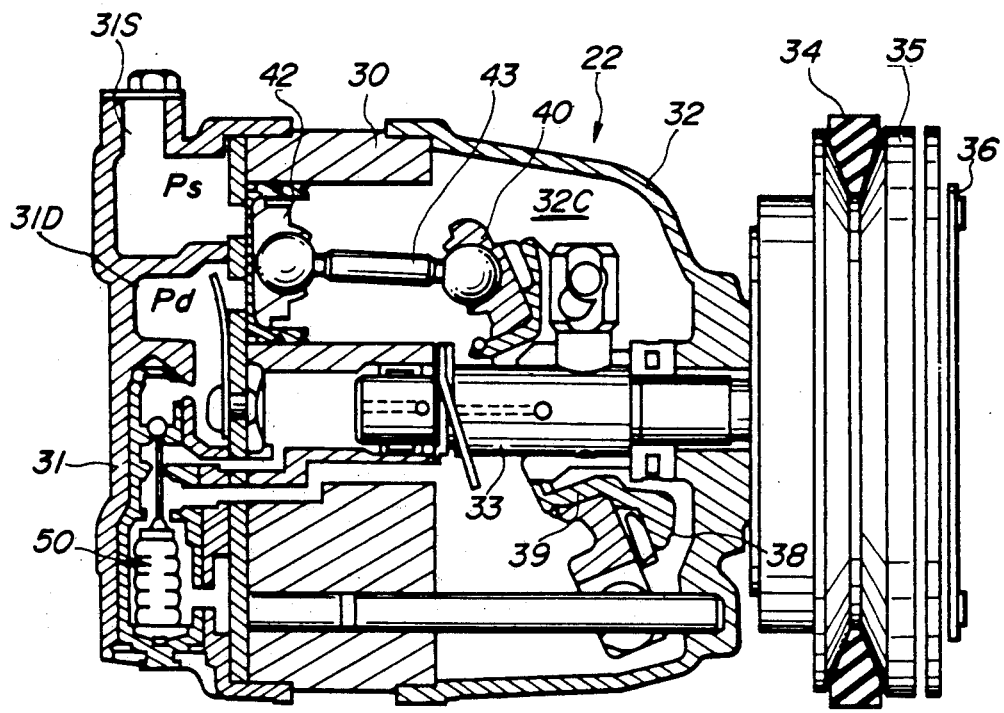
FIG. 2 is a sectional view of the variable displacement compressor used in the air tempering apparatus of FIG. 1.

Referring to FIG. 2, the variable displacement refrigerant compressor 22 comprises a cylinder block 30 having an end cover 31 and a casing 32 sealingly clamped to opposite ends thereof. The end cover 31 defines a suction chamber 31S connected to the evaporator 21 (FIG. 1) and a discharge chamber 31D connected to the condenser 23 (FIG. 1). The casing 32 defines a control chamber 32C and contains a drive shaft 33 mounted for rotation within the control chamber 32C. The drive shaft 33 extends through the control chamber 32C for connection to the engine E (FIG. 1) through a belt 34 looped around a pulley 35 mounted on an electromagentic clutch 36. The drive shaft 33 has a rotary drive plate 38 pivoted thereon for rotation in unison therewith. The rotary drive plate 38 is inclined at an angle with respect to the axis of rotation of the drive shaft 33. The rotary drive plate 38 has a journal 39 with which a non-rotary ring-shaped wobble plate 40 engages.

The cylinder block 30 has a plurality of cylinders 30A equally angularly spaced about and equally radially spaced from the axis of rotation of the drive shaft 33. A piston 42 is mounted for reciprocal motion within each of the cylinders 30A. A connecting rod 43 is pivotally connected to the piston 42 and the wobble plate 40 for producing reciprocation of the piston 42 within the cylinder 30A to suck refrigerant into the control chamber 32C from the suction chamber 31S and discharge the refrigerant from the control chamber 32C into the discharge chamber 31D in response to rotation of the rotary drive plate 38. The arrangement for angulation of the drive plate 38 and the wobble plate 40 are like that disclosed in greater detail in U.S. Pat. No. 4,428,718, in the name of Timothy J. Skinner and entitled "Variable Displacement Compressor Control Valve Arrangement" and which is hereby incorporated by reference.

The angle of inclination of the wobble plate 40 is varied with respect to the axis of rotation of the drive shaft 33 to thereby vary the stroke of the piston 42 and thus the displacement or the capacity of the compressor 22. The wobble plate angle is determined by the refrigerant pressure differential across the pistons 42; that is, the refrigerant pressure differential between the control chamber 32C behind the pistons 42 and the cylinders 30A before the pistons 42.

Figure 3:
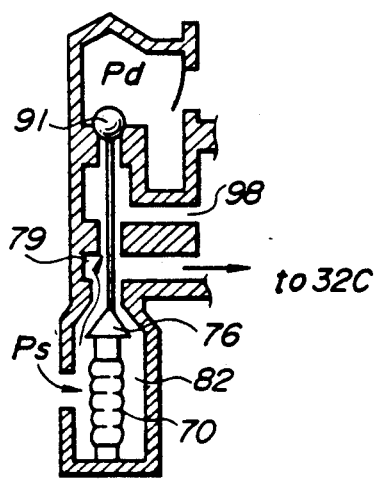
FIGS. 3 and 4 are enlarged fragmentary sectional views used in explaining the operation of the control valve used in the variable displacement compressor.
Figure 4:
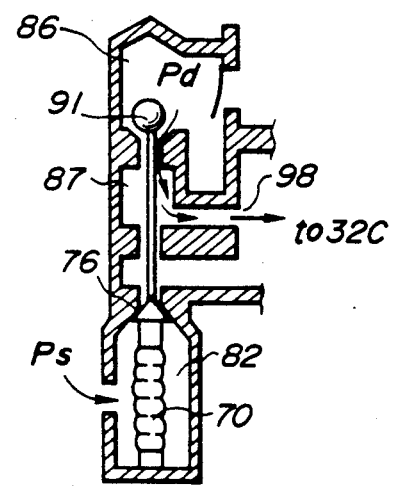

A control valve 50 is provided for selectively introducing the suction and discharge pressures Ps and Pd into the control chamber 32C to control the the wobble plate angle and thus the compressor displacement. The wobble plate angle increases to increase the displacement or the capacity of the compressor 22 when the control valve 50 is in a first position shown in FIG. 3 where the suction pressure Ps is introduced into the control chamber 32C. Alternatively, the wobble plate angle decreases to decrease the displacement or the capacity of the compressor 22 when the control valve 50 is in a second position shown in FIG. 4 where the discharge pressure Pd is introduced into the control chamber 32C.

Figure 5:
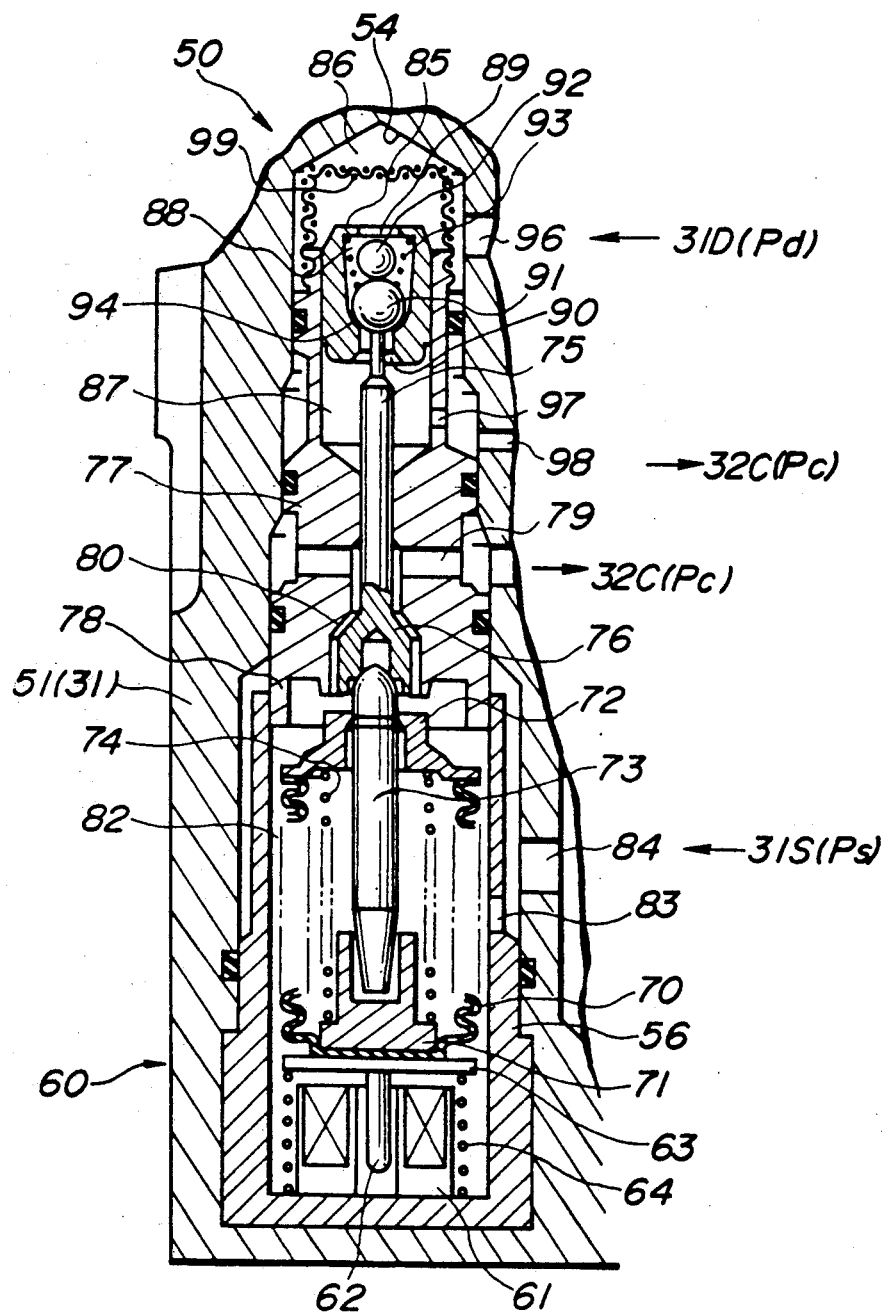
FIG. 5 is an enlarged fragmentary sectional view showing the control valve.

Referring to FIG. 5, the control valve 50 comprises a valve housing 51 which is formed integrally in the end casing 31 and has a stepped valve bore 52 having a closed external end 53 and a closed internal end 54. An end cap 56 is sealingly inserted in the closed external end 53 of the valve bore 52. An electromagnetic actuator 60 is placed in the end cap 56. The electromagentic actuator 60 includes a solenoid 61 and an operating plunger 62 movable into and out of the solenoid 61. The operating plunger 62 terminates in a disc plate 63. A compression coil spring 64 is placed around the solenoid 61 to urge the disc plate 63 toward the solenoid 61. The solenoid 61 extrudes the disc plate 63 against the resilient force of the compression coil spring 64 when it is energized.

A cup-shaped bellows 70 is concentrically located in the end cap 53 and is seated against the disc plate 63. The bellows 70 receives a spring seat member 71 at its closed and seated end. The other end of the bellows 70 is sealingly closed by an end member 72 through which an output rod 73 centrally extends and is sealingly fixed thereto. A compression coil spring 74 is located in the bellows 70 between the seat member 71 and the end member 72 to maintain the bellows 70 in an extended position producing an outward force on the output rod 73. The compression coil spring 74 is selected to have a resilient force much smaller than that of the compression coil spring 64 provided in the electromagnetic actuator 60. The output rod 73 is tapered at its inner end for guided movement in a bore formed in the seat member 71. The opposite end of the output rod 73 engages in a coupling pocket formed in a conical valve element 76 of a valve pin member 75. The valve pin member 75 is sealingly slidably supported for reciprocal movement in a central axial bore formed in a valve body 77 mounted in the valve housing bore 52 inward of the bellows 70. The valve body 77 is formed with a a cylindrical land 78 which is press-fitted in the open end of the end cap 56. The valve body 77 is also formed with a radial passageway 79 and a valve seat 80 associated with the conical valve element 76. A suction pressure connected chamber 82, which is defined between the end cap 56 and the bellows 70, is exposed to the suction chamber 31S through a radial port 83 formed in the end cap 56 and a radial port 84 formed in the valve body 51. When the conical valve element 76 is unseated from the valve seat 80, the suction pressure connected chamber 82 is connected through an annular passage defined between the conical valve element 76 and the valve seat 80 to the radial passageway 79 which in turn is connected to the control chamber 32C.

A valve body member 85 is sealingly received in the outer open end of the valve body 77 to form chambers 86 and 87 on the opposite sides of the valve body member 85. The chamber 86 is exposed to the discharge chamber 31D through a radial port 96 formed in the valve body 51. The chamber 87 is open to the control chamber 32C through a radial port 97 formed in the valve body 77 and a radial port 98 formed in the valve body 51. The valve body member 85 is formed with a valve cavity 88 exposed through an open end 89 to the discharge pressure connected chamber 86 and also through a valve port 90 to the chamber 87. The valve cavity 88 contains a large ball segment 91 and a small ball segment 92 which are welded together. A conical coil compression spring 93 is placed in the valve cavity 88 to urge the large ball segment 91 to a position, illustrated in FIG. 5, so that the large ball segment 91 is held against the end of the valve pin member 75 and seats on the complementary shaped portion 94 of the valve cavity 88 to close the valve port 90. At this position of the large ball segment 91, the communication between the discharge chamber 31D and the control chamber 32C is interrupted. The numeral 99 designates a screen for filtering out foreign matter.

The operation of the control valve 50 is as follows. When the compressor suction pressure Ps is less than a predetermined value Pr determined by the control unit 100, the output rod 73 pushes the valve pin member 75 inwardly under the resilient force of the compression coil spring 74 so that the conical valve element 76 is seated on the valve seat 80 to interrupt communication between the suction pressure connected chamber 82 and the radial passageway 79 and the large ball segment 91 is unseated from the complementary shaped portion 94 to open the valve port 90. This control valve position is shown schematically in FIG. 4 where the discharge pressure Pd is introduced through the discharge pressure connected chamber 86 into the control chamber 32C to decrease the angle of inclination of the wobble plate 40 so as to decrease the displacement or the capacity of the compressor 22.

When the compressor suction pressure Ps exceeds the predetermined value Pr, the bellows 70 contracts to move the end member 72 along with the output rod 73 outwardly against the resilient force of the compression coil spring 74. This permits outward movement of the valve pin member 75 under the resilient force of the conical compression spring 93 so that the large ball segment 91 seats on the complementary shaped portion 94 to close the valve port 90 and the conical valve element 76 is unseated from the valve seat 80 to provide communication between the suction pressure connected chamber 82 and the radial passageway 79. This control valve position is shown schematically in FIG. 3 where the suction pressure Ps is introduced through the suction pressure connected chamber 82 into the control chamber 32C to increase the wobble plate angle so as to increase the displacement or the capacity of the compressor 22.

The predetermined suction pressure value Pr varies in direct proportion to the magnitude of the current applied to the solenoid 61 of the electromagnetic actuator 60. When the solenoid 61 is de-energized, the disc plate 63 is at a position where the resilient forces of the compression coil springs 64 and 74 are balanced. As the solenoid current Is to the solenoid 61 increases, the disc plate 63 moves inwardly from the balanced position to increase the resilient force of the compression coil spring 74 and thus the predetermined suction pressure value Pr in direct proportion to the solenoid current Is.

Figure 6:
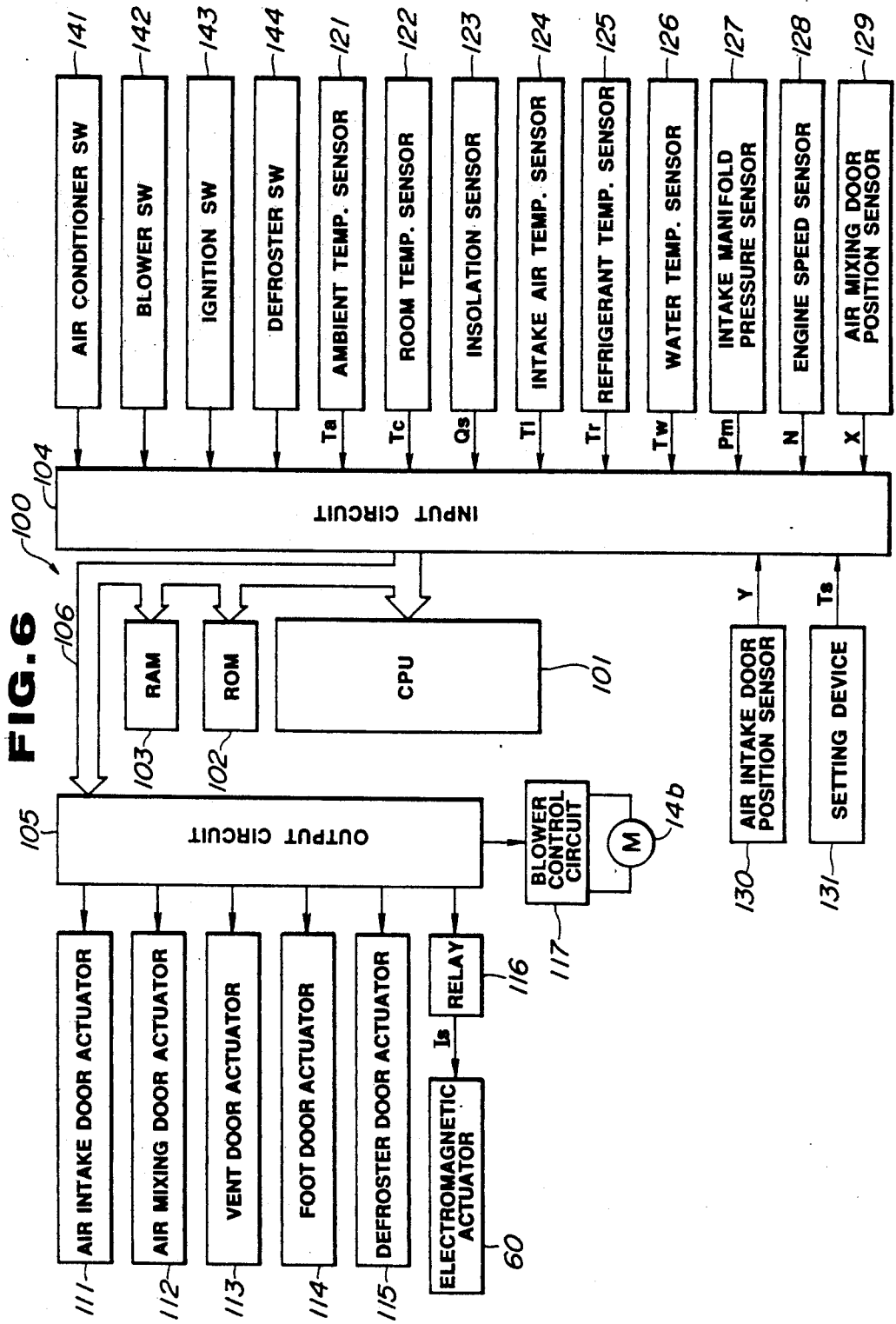
FIG. 6 is a schematic block diagram showing a control unit used with the air tempering apparatus of FIG. 1.

Referring to FIG. 6, there is illustrated a schematic block diagram of a control unit used for controlling the air tempering system of the invention. The control unit, generally designated by the numeral 100, controls the air intake door actuator 111, the air mixing door actuator 112, the vent door actuator 113, the foot door actuator 114, the defroster door actuator 115, the relay 116 connected to the solenoid 61 of the electromagnetic actuator 60, and the blower control circuit 117 based upon various conditions that are sensed during the operation of the air tempering system. These sensed conditions includes ambient temperature, compartment temperature, insolation intensity, intake (chilled) air temperature, refrigerant temperature, engine coolant temperature, engine intake manifold pressure, engine speed, air mixing door position, and air intake door position. Thus, an ambient temperature sensor 121, a compartment temperature sensor 122, an insolation intensity sensor 123, an intake air temperature sensor 124, a refrigerant temperature sensor 125, an engine coolant temperature sensor 126, an engine intake manifold pressure sensor 127, an engine speed sensor 128, an air mixing door position sensor 129, and an air intake door position sensor 130 are connected to the control unit 100. The ambient temperature sensor 121 is positioned sense ambient temperature and it produces an ambient temperature signal indicative of a sensed ambient temperature Ta. The compartment temperature sensor 122 is positioned to sense compartment temperature and it produces a compartment temperature signal indicative of a sensed compartment temperature Tc. The insolation intensity sensor 123 is provided to sense insolation intensity and it produces an insolation intensity signal indicative of a sensed insolation intensity Qs. The intake air temperature sensor 124 is positioned to sense intake (chilled) air temperature and it produces an intake air temperature signal indicative of a sensed intake air temperature Ti. A preferred location for this intake air temperature sensor 124 is in the duct 11 somewhere downstream of the evaporator 21 and upstream of the air mixing door 16. The refrigerant temperature sensor 125 is positioned to sense refrigerant temperature and it produces a refrigerant temperature signal indicative of a sensed refrigerant temperature Tr. A preferred location for this refrigerant temperature sensor 125 is in the refrigeration system 20 somewhere downstream of the expansion valve 25. The engine coolant temperature sensor 126 is positioned to sense engine coolant temperature and it produces an engine coolant temperature signal indicative of a sense engine coolant temperature Tw. The intake manifold pressure sensor 127 is located in the engine's air intake system somewhere downstream of the throttle valve and it produces an engine intake manifold pressure signal indicative of a sensed engine intake manifold pressure Pm. The engine speed sensor 128 is positioned to sense engine speed and it produces an engine speed signal indicative of a sensed engine speed N. The air mixing door position sensor 129 is provided to sense air mixing door position and it produces an air mixing door position signal indicative of a sensed angle X of opening of the air mixing door 11. The air intake door position sensor 130 is provided to sense air intake door position and it produces an air intake door position signal indicative of a sensed air intake door position Y. A compartment temperature setting device 131 is also connected to the control unit 100. The compartment temperature setting device 131 is mounted on the vehicle instrument panel at a convenient position for the passenger to set a desired value Ts for compartment temperature. The control unit 100 also receives signals indicative of the states of various switches including an air conditioner switch 141, a blower switch 142, an engine ignition switch 143, and a defroster switch 144.

The control unit 100 employs a digital computer which shall be regard as including a central processing unit (CPU) 101, a read only memory (ROM) 102, a random access memory (RAM) 103, an input control unit 104, and an output control unit 105. The central processing unit 101 communicates with the rest of the computer via data bus 106. The input control unit 104 receives the signals from the sensors and the switches. The input control unit 104 includes an analog-to-digital converter which converts the received analog signals from the sensors into corresponding digital signals for application to the central processing unit 101. The read only memory 102 contains the program for operating the central processing unit 101 and further contains appropriate data in look-up tables used in calculating appropriate values for controlling the actuators 111-115, an appropriate value for the solenoid current Is applied through the relay 116 to the electromagnetic actuator 60 and an appropriate value for the voltage applied through the blower control circuit 117 to the blower motor 14b. Control words specifying calculated values are periodically transferred by the central processing unit 101 to the output control unit 105 which converts the transferred information into analog form for application to the circuits 111-117.

Figure 7:
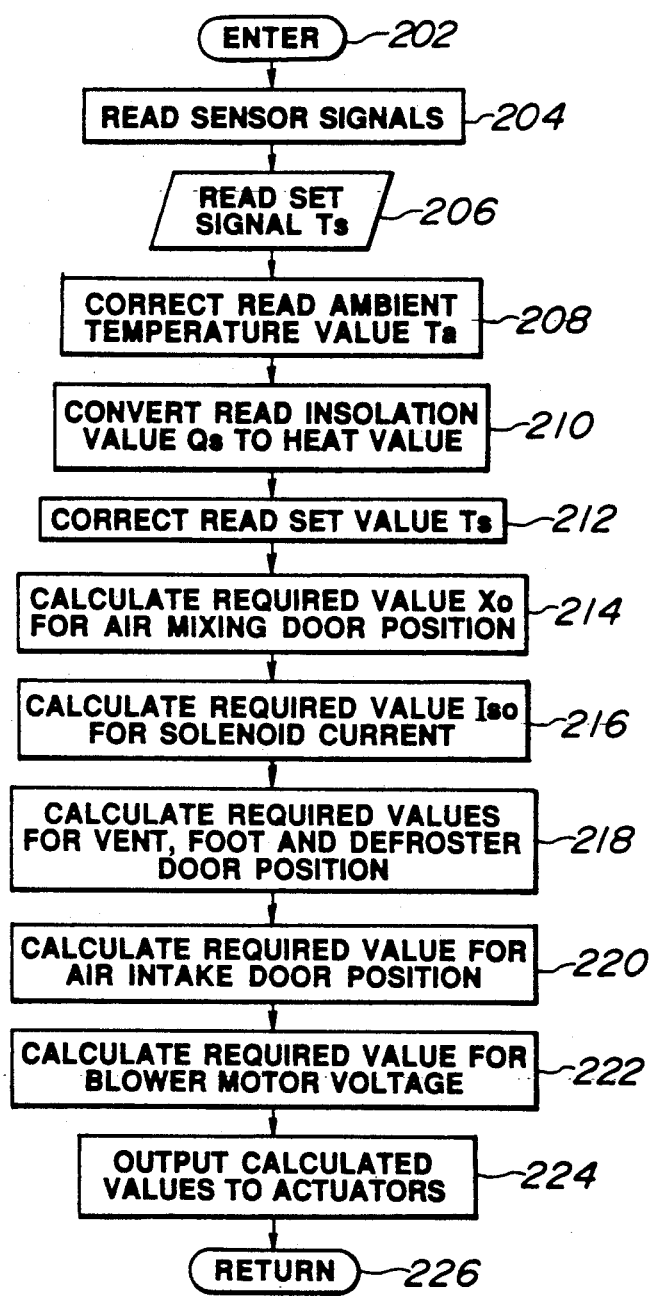
FIG. 7 is an overall flow diagram of the programming of the digital computer used in the control unit.

FIG. 7 is an overall flow diagram of the programming of the digital computer used in the control unit 100 for controlling the air tempering system of the invention. The computer program is entered at the point 202 when the engine ignition switch 143 is turned on. At the point 204 in the program, the various inputs to the input control unit 104 are, one by one, converted by the analog-to-digital converter into digital form and read into the random access memory 102 via the data bus 106. Thus, the ambient temperature signal fed from the ambient temperature sensor 121, the compartment temperature signal fed from the compartment temperature sensor 122, the insolation intensity signal fed from the insolation intensity sensor 123, the intake air temperature signal fed from the intake air temperature sensor 124, the refrigerant temperature signal fed from the refrigerant temperature sensor 125, the engine coolant temperature signal fed from the engine coolant temperature sensor 126, the intake manifold pressure signal fed from the intake manifold pressure sensor 127, the engine speed signal fed from the engine speed sensor 128, the air mixing door position signal fed from the air mixing door position sensor 129, and the air intake door position signal fed from the air intake door position sensor 130 are converted to digital form and read into the random access memory 103. At the point 205 in the program, a desired value Ts, which is set by the setting device 131 for compartment temperature, is converted to digital form and read into the random access memory 103.

At the point 208 in the program, the read ambient temperature value Ta is corrected to eliminate thermal disturbances introduced from heat sources including the condenser, the radiator, etc. The corrected ambient temperature value Ta* is stored in the random access memory 103. At the point 210 in the program, the read insolation intensity value Qs is converted into a corresponding heat value Qs* for the convenience of the following processes. The heat value Qs* is stored in the random access memory 103. At the point 212 in the program, the desired compartment temperature value Ts is corrected for the corrected ambient temperature value Ta*. The corrected value Ts* is stored in the random access memory 103.

At the point 214 in the program, the central processing unit 101 calculates a target value To for tempered air temperature based on the corrected ambient temperature value Ts*, the read compartment temperature Tc, the corrected ambient temperature value Ta* and the heat value Qs* and it calculates a required value Xo for air mixture door position based on a difference between the calculated tempered air temperature value To and the read intake air temperature value Ti. At the point 216 in the program, the central processing unit 101 calculates a required value Iso for the solenoid current applied to the electromagnetic actuator 60.

At the point 218 in the program, the central processing unit 101 calculates required values for vent, foot and defroster door positions. At the point 220 in the program, the central processing unit 101 calculates a required value for air intake door position. At the point 222 in the program, the central processing unit 101 calculates a required value for blower motor driving voltage. At the point 224 in the program, the calculated values are transferred through the output control unit 105 to the actuators 111–117. Following this, the program proceeds to the point 226 where the computer program returns to the entry point 202.

In the preceding paragraphs, the calculations at the points 214 and 216 in the program of FIG. 7 were not described in detail. This detail is presented in the following subsections.

Figure 8:
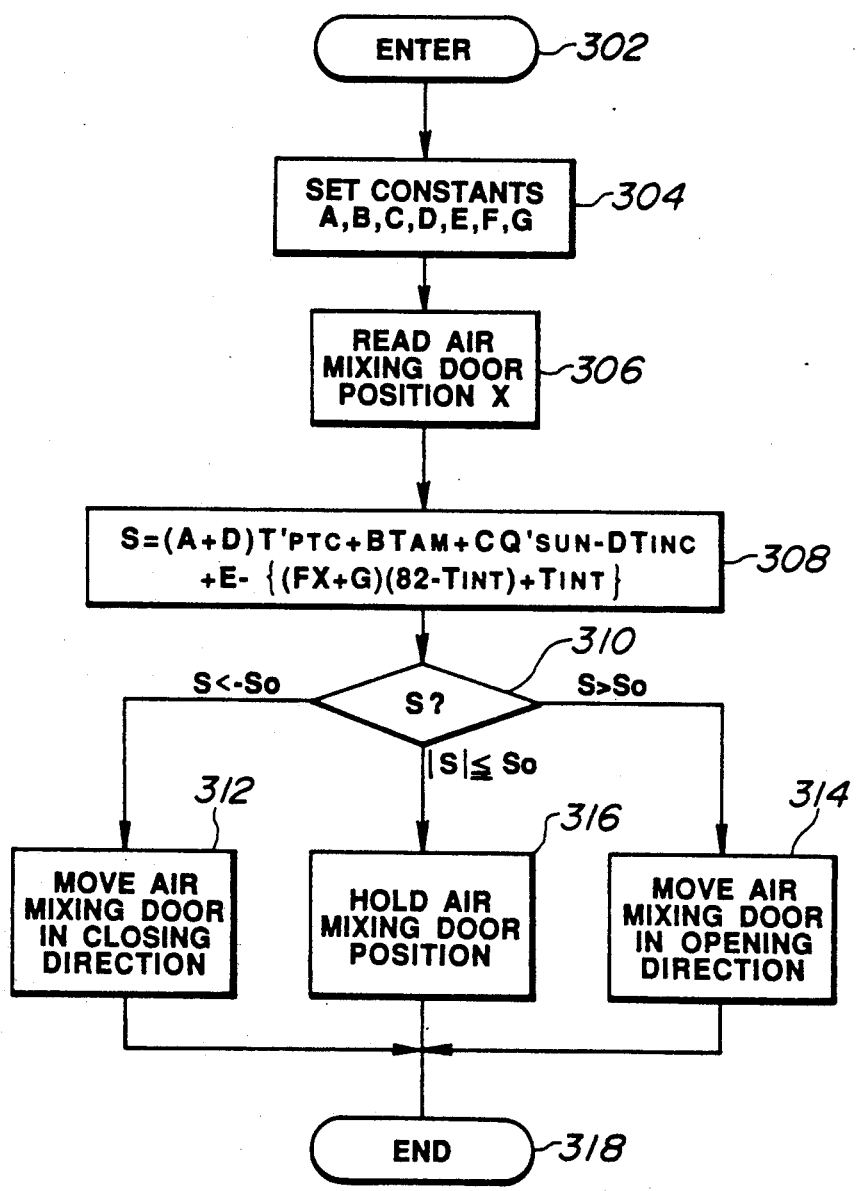
FIG. 8 is a flow diagram of the programming of the digital computer as it is used to calculate a required value for air mixing door position.

FIG. 8 is a flow diagram of the programming of the digital computer as it is used to calculate a required value Xo for the angle of opening of the air mixing door 16. At the point 302 in FIG. 8, which corresponds to the point 214 of FIG. 7, the computer program is entered. At the point 304 in the program, various constants A, B, C, D, E, F and G are set for use in calculating a tempered air temperature error S. At the point 306 in the program, the air mixing door position signal fed from the air mixing door position sensor 129 is converted to digital form and read into the random access memory 103.

At the point 308 in the program, the central processing unit 101 calculates a tempered air temperature error S between the target tempered air temperature value To and the actual tempered air temperature value as $S = \{(A+D) \times Ts + B \times Ta^* + C \times Qs^* - D \times Tc + E\} - \{(F \times X + G) \times (82 - Ti) + Ti\}$ where X is the read air mixing door position value. The term $\{(A+D) \times Ts + B \times Ta^* + C \times Qs^* - D \times Tc + E\}$ indicates the target tempered air temperature value and the term $\{(F \times X + G) \times (82 - Ti) + Ti\}$ indicates the actual tempered air temperature value.

At the point 310 in the program, the calculated tempered air temperature error S is compared with a predetermined value So (for example, 2° C.). If $S < -So$, then the program proceeds to the point 312 where the central processing unit 101 calculates a required value Xo for air mixing door position and stores the calculated value Xo in the random access memory 103. This stored value Xo is transferred at the point 224 of FIG. 7, causing the air mixing door actuator 112 to move the air mixing door 16 in a closing direction to decrease the reheating capacity. If $S > +So$, then the program proceeds to the point 314 where the central processing unit 101 calculates a required value Xo for air mixing door position and stores the calculated value Xo in the random access memory 103. This stored value Xo is transferred at the point 224 of FIG. 7, causing the air mixing door actuator 112 to move the air mixing door 16 in an opening direction to increase the reheating capacity. Otherwise, the program proceeds to the point 316 where the central processing unit 101 calculates a required value Xo for air mixing door position and stores the calculated value Xo in the random access memory 103. This stored value Xo is transferred at the point 224 of FIG. 7, causing the air mixing door actuator 112 to hold the air mixing door 16 at the existing position. Following this, the program proceeds to the end point 318 which corresponds to the point 214 of FIG. 7.

Figure 9:
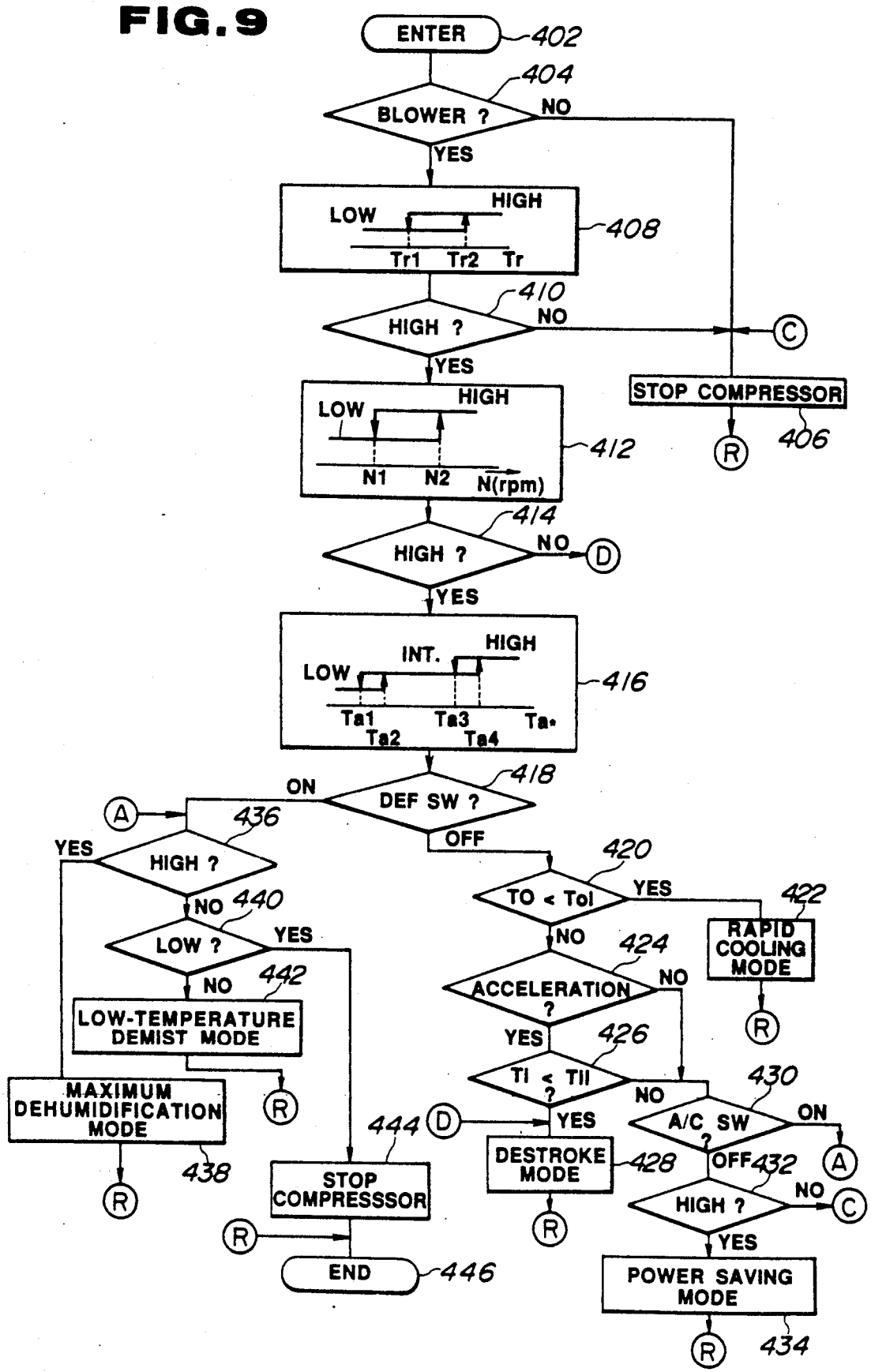
FIG. 9 is a flow diagram of the programming of the digital computer as it is used to select one of various modes of operation of the compressor.

FIG. 9 is a flow diagram of the programming of the digital computer as it is used to select one of various modes of operation of the compressor 22. At the point 402 in FIG. 9, which corresponds to the point 216 of FIG. 7, the computer program is entered. At the point 404, a determination is made as to whether the blower motor 14b is ON or OFF. This determination is made based on the signal fed to the control unit 100 from the blower switch 142. If the blower motor 14b is off, then the program proceeds to the point 406 where the compressor 22 is stopped and then to the end point 446. If the blower motor 14b is operating, then the program proceeds from the point 404 to the point 408 where the central processing unit 101 determines the range of the thermal load of the refrigerant. This determination is made by a comparison of the read refrigerant temperature value Tr hysteretically with a first reference value Tr1 (for example, $-15°$ C.) when the refrigerant temperature is decreasing and with a second, greater reference value Tr2 (for example, 0° C.) when the refrigerant temperature is increasing. This is effective to eliminate the tendency toward hunting. It is to be noted that the reference value Tr1 is less than a reference value T21 used during a low-temperature demist mode to be described later. At the point 410 in the program, a determination is made as to whether or not the thermal load of the refrigerant is in a high thermal load range. If answer to this question is "yes", then it means that the read refrigerant temperature Tr is greater than the first reference value Tr1 when the refrigerant temperature is decreasing or the read refrigerant temperature Tr is greater than the second, greater reference value Tr2 when the refrigerant temperature is increasing and the program proceeds to the point 406 where the compressor 22 is stopped. Otherwise, the refrigerant thermal load is in a low thermal load range and the program proceeds to the point 412.

At the point 412 in the program, the central processing unit 101 determines the range of the engine speed. This determination is made by a comparison of the read engine speed N hysteretically with a first reference value N1 (for example, 4500 rpm) when the engine speed is decreasing and with a second, greater reference value N2 (for example, 5000 rpm) when the engine speed is increasing. This is effective to avoid the tendency toward hunting. At the point 414 in the program, a determination is made as to whether or not the engine speed is in a high speed range. If the answer to this question is "yes", then it means that the read engine speed value N is greater than the first reference value N1 when the engine speed is decreasing or the read engine speed value N is greater than the second, greater reference value N2 when the engine speed is increasing and the program proceeds to the point 428 where a destroke mode is selected for the operation of the compressor 22. Otherwise, the engine speed is in a low speed range and the program proceeds to the point 416.

At the point 416 in the program, the central processing unit 101 determines the range of the corrected ambient temperature value Ta*. This determination is made by a comparison of the corrected ambient temperature value Ta* hysteretically with a first reference value Ta1 (for example, −5° C.) when the ambient temperature is decreasing and with a second, greater reference value Ta2 (for example, −2° C.) greater than the first reference value Ta1 when the ambient temperature is increasing and a comparison of the corrected ambient temperature value Ta* hysteretically with a third reference value Ta3 (for example, 5° C.) greater than the second reference value Ta2 when the ambient temperature is decreasing and with a fourth reference value Ta4 (for example, 8° C.) greater than the third reference value Ta3 when the ambient temperature is increasing. The ambient temperature is in a low temperature range when the corrected ambient temperature value Ta* is less than the first reference value Ta1 when the ambient temperature is decreasing or when the corrected ambient temperature value Ta* is less than the second reference value Ta2 when the ambient temperature is increasing. The ambient temperature is in a high temperature range when the corrected ambient temperature value Ta* is greater than the third reference value Ta3 when the ambient temperature is decreasing or when the corrected ambient temperature value Ta* is greater than the fourth reference value Ta4 when the ambient temperature is increasing. The ambient temperature is in an intermediate temperature range in the other cases.

At the point 418 in the program, a determination is made as to whether the defroster switch is ON or OFF. This determination is made based on the signal fed to the control unit 100 from the defroster switch 144. If the defroster switch 144 is ON, then the program proceeds to the point 444. Otherwise, the program proceeds to the point 420.

At the point 420 in the program, a determination is made as to whether or not the target tempered air temperature value To, which is calculated at the point 214 of FIG. 7, is less than a predetermined value To1 (for example, −10° C.) below which the air mixing door 16 is placed at its closed position. If the answer to this question is "yes", then the program proceeds to the point 422 where the central processing unit 101 selectes a rapid cooling mode for the operation of the compressor 22 and calculates a required solenoid current value Iso for the rapid cooling mode of operation of the compressor 22. This calculation will be described further in connection with FIG. 10. Otherwise, the program proceeds to another determination step at the point 424. This determination is as to whether or not the engine is accelerating. This determination is made based on the engine intake manifold pressure signal fed to the control unit 100 from the engine intake manifold pressure sensor 127. If the answer to this question is "yes", then the program proceeds to the point 426. Otherwise, the program proceeds to the point 430.

At the point 426 in the program, a determination is made as to whether or not the read intake air temperature value Ti is less than a predetermined value Ti1 (for example, 5° C.). If the answer to this question is "yes", then the program proceeds to the point 428 where the central processing unit 101 selects a destroke mode for the operation of the compressor 22 and calculates a required solenoid current value Iso for the destroke mode of operation of the compressor 22. This calculation will be described further in connection with FIG. 15. Otherwise, the program proceeds to the point 430.

At the point 430 in the program, a determination is made as to whether the air conditioner switch 141 is ON or OFF. This determination is made based on the signal fed to the control unit 100 from the air conditioner switch 141. If the air conditioner switch 141 is ON, then the program proceeds to the point 436. Otherwise, the program proceeds to another determination step at the point 432. This determination is as to whether or not the corrected ambient temperature Ta* is in the high temperature range. If the answer to this question is "yes", then the program proceeds to the point 434 where the central processing unit 101 selects a power and fuel saving mode for the operation of the compressor 22 and calculates a required solenoid current value Iso for the power and fuel saving mode of operation of the compressor 22. This calculation will be described further in connection with FIG. 16. Otherwise, the program proceeds to the point 406 where the compressor 22 is stopped.

At the point 436 in the program, a determination is made where the corrected ambient temperature Ta* is in the high temperature range. If the answer to this question is "yes", then the program proceeds to the point 438 where the central processing unit 101 selects a maximum dehumidification mode for the operation of the compressor 22 and calculates a required solenoid current value Iso for the maximum dehumidification mode of operation of the compressor 22. This calculation will be described further in connection with FIG. 18. Otherwise, the program proceeds to another determination step at the point 440. This determination is as to whether or not the corrected ambient temperature Ta* is in the low temperature range. If the answer to this question is "yes", then the program proceeds to the point 444. Otherwise, the program proceeds to the point 442 where the central processing unit 101 selects a low temperature demist mode for the operation of the compressor 22 and calculates a required solenoid current value Iso for the low temperature demist mode of operation of the compressor 22. This calculation will be described further in connection with FIGS. 19 and 20. At the point 444 in the program, the compressor 22 is stopped. Following this, the program proceeds to the end point 446 which corresponds to the point 218 of FIG. 7.

Figure 10:
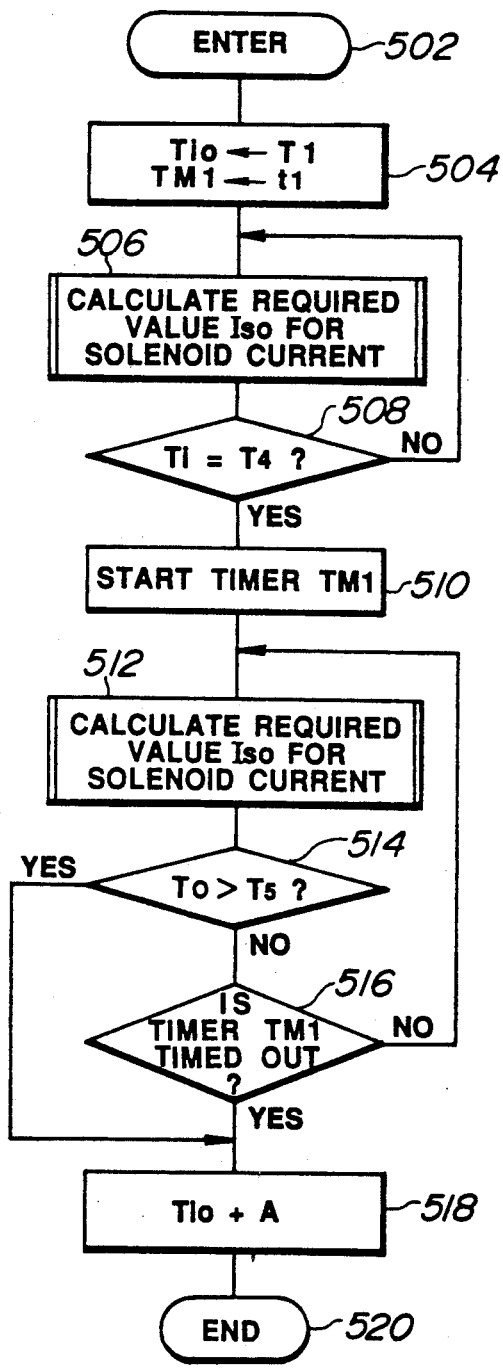
FIG. 10 is a flow diagram of the programming of the digital computer as it is used to operate the compressor in a rapid cooling mode.

FIG. 10 is a flow diagram of the programming of the digital computer as it is used to operate the compressor 22 in a rapid cooling mode. At the point 502 in FIG. 10, which corresponds to the point 422 of FIG. 9, the computer program is entered. At the point 504 in the program, the central processing unit 101 sets a target value Tio for intake air temperature Ti at a predetermined value T1 (for example, 0° C.) that is less than a predetermined temperature T4 (for example, 3° C.) below which the evaporator 21 may freeze. When the target intake air temperature value Tio is set at such a small value T1, the reference suction pressure Ps can be set at a small value. This is effective to provide a greater displacement or capacity to the compressor 22 at small suction pressures Ps. The central processing unit 101 also sets a first timer TM1 at a first predetermined value t1 that is less than the time required for the evaporator 21 to freeze at the predetermined temperature T1 when the ambient temperature is high such as during the day in summer.

At the point 506 in the program, the central processing unit 101 calculates a required value Iso for the solenoid current Is applied to the electromagnetic actuator 60. This calculation will described further in connection with FIG. 11.

At the point 508 in the program, a determination is made as to whether or not the read intake air temperature value Ti is equal to the predetermined temperature T4. If the answer to this question is "yes", then the program proceeds to the point 510 where the central processing unit 101 starts the first timer TM1. Otherwise, the program returns to the point 506.

At the point 512 in the program, the central processing unit 101 calculates a required value Iso for the solenoid current Is applied to the electromagnetic actuator 60. This calculation is made in the same manner as made at the point 506 and will be described further in connection with FIG. 11. At the point 514 in the program, a determination is made as to whether or not the target tempered air temperature value To, which is calculated at the point 214 of FIG. 7, is less than a predetermined value T5 (for example, 8° C.) below which the air mixing door 16 opens to introduce air flow to the heater core 15. If the answer to this question is "yes", then the program proceeds to the point 516 where a determination is made as to whether or not the first timer TM1 is timed out; that is, the set time t1 has elapsed. If the answer to this question is "yes", then the program proceeds to the point 518. Otherwise, the program returns to the point 512. If the target tempered air temperature value To is equal to or greater than the predetermined value T5, then the program proceeds from the point 514 directly to the point 518. At the point 518, the central processing unit 101 adds a predetermined amount A to the target intake air temperature value Tio to increase it from the predetermined value T1 at a rate of 1° C. per second. Following this, the program proceeds to the end point 520 where corresponds to the point 218 of FIG. 7.

Figure 11:
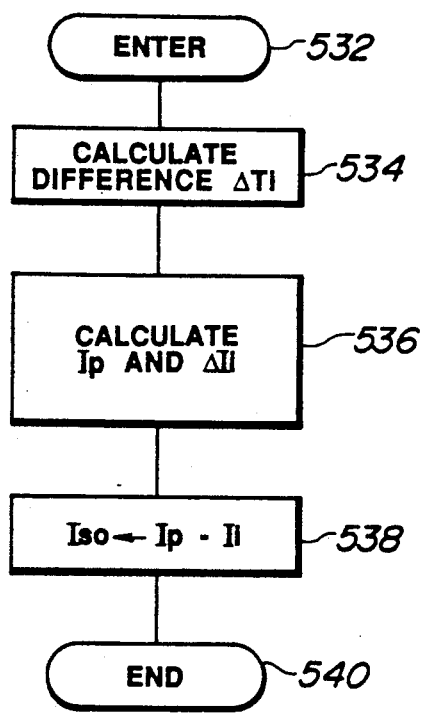
FIG. 11 is a flow diagram of the programming of the digital computer as it is used to calculate a required value for solenoid current.
Figure 13:
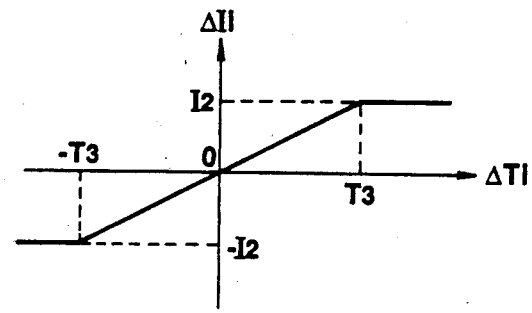
FIGS. 12 and 13 are graphs showing relationships used in calculating the required solenoid current value.
Figure 12:
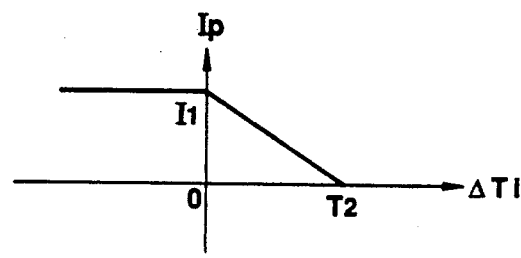

FIG. 11 is a flow diagram of the programming of the digital computer as it is used to calculate a required value Iso for the solenoid current Is applied to the electromagnetic actuator 60. At the point 532 in FIG. 11, which corresponds to the point 506 or 512 of FIG. 10, the computer program is entered. At the point 534 in the program, the central processing unit 101 calculates a difference ΔTi of the target intake air temperature value Tio from the read intake air temperature value Ti. At the point 536 in the program, the central processing unit 101 calculates a proportional current Ip based on the calculated difference ΔTi. The proportional current Ip is determined from a relationship that specifies the proportional current Ip as a function of the calculated difference ΔTi, as shown in FIG. 12. In FIG. 12, the character T2 indicates a temperature difference (for example, 20° C.) and the character I1 indicates a proportional current (for example, 0.8 amperes). This relationship may be obtained experimentally. The central processing unit 101 also calculates an integral current Ii by adding an integral current difference ΔIi to the last integral current Ii. The integral current difference ΔIi is determined from a relationship that specifies this difference ΔIi as a function of the calculated difference ΔTi, as shown in FIG. 13. In FIG. 13, the character T3 indicates a temperature difference (for example, 6° C.) and the character I2 indicates an integral current difference (for example, 0.98 milliamperes). This relationship may be obtained experimentally.

At the point 538 in the program, the central processing unit 101 calculates a required solenoid current value Iso by subtracting the calculated integral current Ii from the calculated proportional current Ip. Following this, the program proceeds to the end point 540 which corresponds to the point 508 or 514 of FIG. 10.

Figure 14:
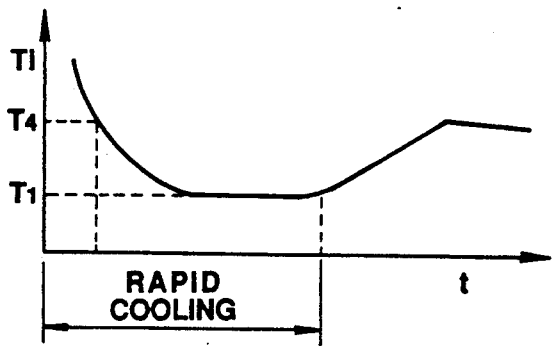
FIG. 14 is a graph of time versus chilled air temperature.

Accordingly, when the compressor 22 is operating in the rapid cooling mode, the solenoid current Is decreases at a high rate until the intake air temperature Ti reaches the predetermined temperature T1. As the solenoid current Is decreases, the disc plate 63 moves outward toward the solenoid 61 to decrease the reference suction pressure Pr below which the conical valve element 76 is unseated from the valve seat 80. As a result, the conical valve element 76 is unseated from the valve seat 80 to communicate the suction pressure connected chamber 82 with the control chamber 32C so as to provide an increased displacement or capacity to the compressor 22 even at small compressor suction pressures Ps. The compressor 22 operates in such a rapid cooling mode until the time t1, which is set on the first timer TM1 when the intake air temperature Ti decreases to the predetermined value T4, has elasped, or until the target tempered air temperature To increases to the predetermined value T5, as shown in FIG. 14. In other words, the compressor 22 operates in a rapid cooling mode for a predetermined period of time with the intake air temperature being held at the value T1 to rapidly cool the passenger compartment.

Destroke Mode during Acceleration

The compressor 22 is operated in a destroke mode when the intake air temperature Ti is less than a predetermined value Ti1 during acceleration. In this case, the evaporator 21 has a sufficient refrigerating capacity. Thus, the control unit 100 provides priority to the engine acceleration performance over the refrigerating performance by increasing the reference value Pr for the control valve 50 so that the compressor discharge pressure Pd can be introduced into the control chamber 32C even when the compressor suction pressure Ps increases to some extent. This reduces the power consumed in the compressor 22 and improves the engine acceleration performance.

Destroke Mode at High Engine Speed

At high engine speeds, the compressor 22 operates at high speeds to provide a required flow rate of refrigerant even at small wobble plate angles. For this reason, it is desirable to improve the durability of the compressor 22 by decreasing the wobble plate angle to decrease the speed of reciprocation of the pistons when the engine is operating at high speeds.

Figure 15:
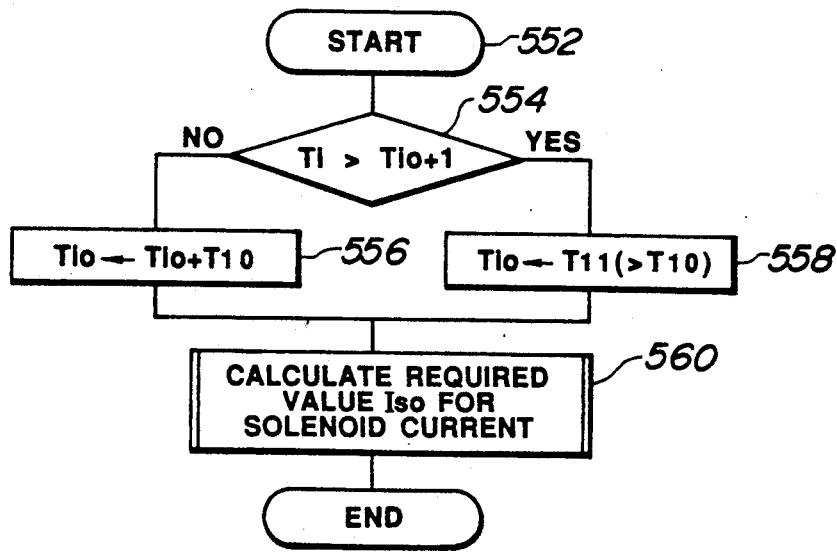
FIG. 15 is a flow diagram of the programming of the digital computer as it is used to operate the compressor in a destroke mode.

FIG. 15 is a flow diagram of the programming of the digital computer as it is used to operate the compressor 22 in a destroke mode. At the point 552 in FIG. 15, which corresponds to the point 428 of FIG. 9, the computer program is entered. At the point 554 in the program, a determination is made as to whether the read intake air temperature value Ti is greater than the sum (Tio+1) of the target intake air temperature value Ti and 1° C. If the answer to this question is "no", then it means that the evaporator 21 is operating to chill the intake air to a temperature close to the target intake air temperature value Tio and the program proceeds to the point 556 where the central processing unit 101 modifies the target intake air temperature value Tio by adding a predetermined small value T10 (for example, 5° C.) to the target intake air temperature value Tio. Otherwise, it means that the intake air temperature Ti is apart from the target intake air temperature value Tio and the program proceeds to the point 558 where the central processing unit 101 modifies the target intake air temperature value Tio to a predetermined value T11 (for example, 20° C.) greater than the predetermined small value T10. At the point 560 in the program, the central processing unit 101 calculates a required value Iso for the solenoid current Is applied to the electromagnetic actuator 60 by subtracting the integral current Ii from the proportional current Ip. For this calculation, the same program as described in connection with FIG. 11 is used. Following this, the program proceeds to the end point 562 which corresponds to the point 218 of FIG. 7.

When the intake air temperature is close to the target intake air temperature value Tio, the target intake air temperature value Tio is increased by a predetermined small value T10. This increases the required solenoid current value Iso. As a result, the disc plate 63 moves further away from the solenoid 61 to increase the resilient force of the compression coil spring 74 and thus increase the reference suction pressure level Pr. Consequently, the discharge pressure Pd is introduced into the control chamber 32C to provide a decreased displacement or capacity to the compressor 22 even at higher compressor suction pressures Ps. In this case, the tempered air temperature does not increase even the flow rate of the refrigerant decreases since the read intake air temperature value Ti increases so that the air mixing door 16 is moved in a closing direction when the target intake air temperature value Tio increases.

When the intake air temperature is apart from the target intake air temperature value Tio, the target intake air temperature value Tio is set at the predetermined value T11 to increase the required solenoid current value Iso to a great extent giving priority to the engine acceleration performance over the cooling performance. The predetermined value T11, which corresponding to an intake air temperature obtained when the compressor 22 has a minimum displacement or capacity, may be obtained experimentally. In this case, the disc plate 63 moves a distance away from the solenoid 61. This distance is greater than obtained when the intake air temperature value is closed to the target value. As a result, the compression coil spring 74 has an increased resilient force to increase the reference suction pressure level Pr to such an extent as to provide a minimum displacement or capacity to the compressor 22 even when the suction pressure Ps increases to some extent.

Figure 16:
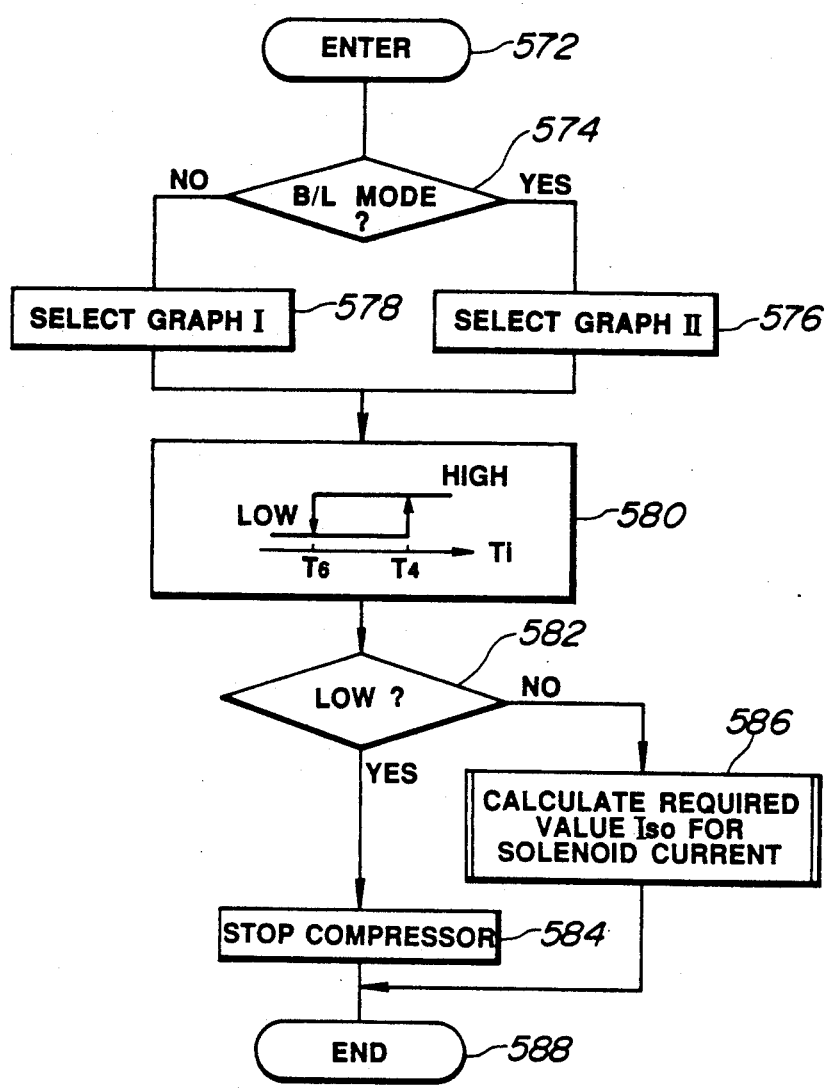
FIG. 16 is a flow diagram of the programming of the digital computer as it is used to operate the compressor in a fuel and power saving mode.
Figure 17:
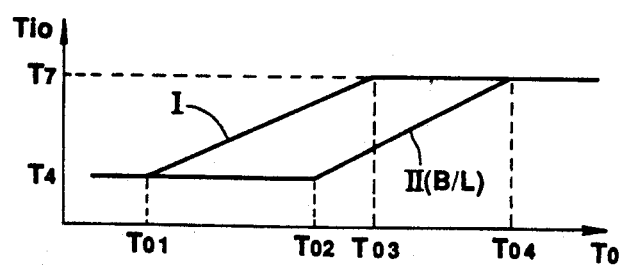
FIG. 17 is a graph showing relationships used in calculating a target value for chilled air temperature.

FIG. 16 is a flow diagram of the programming of the digital computer as it is used to operate the compressor 22 in a fuel and power saving mode. At the point 572 in FIG. 16, which corresponds to the point 434 of FIG. 9, the computer program is entered. At the point 574 in the program, a determination is made as to whether or not the air tempering system is operating in a bilevel mode where the vent door actuator 113 places the vent door 17 at its second position opening the ventilator port 17a, the foot door actuator 114 places the foot door 18 at its first position opening the foot port 18a, and the defroster door actuator 115 places the defroster door 19 at its first position closing the defroster port 19a. If the answer to this question is "yes", then the program proceeds to the point 576 where the central processing unit 101 calcualtes a target intake air temperature value Tio based on the target tempered air temperature To. This calculation is made with the use of a relationship II indicated by the character II in FIG. 17. This relationship II specifies target intake air temperature value Tio as a function of target tempered air temperature To. If the answer to the question inputted at the point 574 is "no", then it means that the air tempering system is operating in a heater or vent mode and the program proceeds to the point 578 where the central processing unit 101 calculates a target intake air temperature value Tio based on the target tempered air temperature To from a relationship I indicated by the character I in FIG. 17. This relationship I specifies target intake air temperature value Tio as a function of target tempered air temperature To. In FIG. 17, the character T01 designates a first predetermined value (for example, 8° C.), the character T02 designates a second predetermined value (for example, 18° C.), the character T03 designates a third predetermined value (for example, 20° C.), and the character T04 designates a fourth predetermined value (for example, 30° C.). These predetermined values are obtained experimentally for the target tempered air temperature To. The character T7 designates a predetermined value (for example, 15° C.) obtained experimentally for the target intake air temperature Tio.

At the point 580 in the program, the central processing unit 101 determines the range of the intake air temperature Ti. This determination is made by a comparison with the read intake air temperature value Ti hysteretically with a reference value T6 (for example, 1.5° C.) somewhat lower than the reference value T4 (for example, 3° C.) below which the evaporator 21 may freeze when the intake air temperature is decreasing and with the reference value T4 when the intake air temperature is increasing. This is effective to eliminate the tendency toward hunting. At the point 582 in the program, a determination is made as to whether or not the intake air temperature is in a low temperature range. If the answer to this question is "yes", then it means that the read intake air temperature value Ti is less than the reference value T6 when the intake air temperature is decreasing or the read intake air temperature value Ti is less than the reference value T4 when the intake air temperature is increasing and the program proceeds to the point 584 where the compressor 22 is stopped. Otherwise, the intake air temperature is in a high temperature range and the program proceeds to the point 586 where the central processing unit 101 calculates a required value Iso for the solenoid current Is applied to the electromagnetic actuator 60 in the same manner as described in connection with FIG. 11. Following this, the program proceeds to the end point 5888 which corresponds to the point 218 of FIG. 7.

Prior art air tempering systems have arranged to control the tempered air temperature by adjusting the angle of opening of the air mixing door 16 based on a difference of the existing intake air temperature from the target tempered air temperature value. However, such prior art air tempering systems have a tendency toward undesirable intake air temperature drops because of engine speed fluctuations. In order to eliminate this tendency, it is the conventional practice to control the tempered air temperature to the target value To with the air mixing door 16 being open. For this reason, the compressor 22 consumes waste power which results in an appreciable fuel economy loss.

In this embodiment of the invention, the tempered air temperature is controlled by adjusting the intake air temperature corresponding to the compressor displacement or capacity. The compressor displacement or capacity is controlled to avoid such intake air temperature drops which may occur in the prior art air tempering systems. This compressor displacement control is made based on a target intake air temperature Tio calculated from a selected one of two relationships I and II programmed into the computer. The relationships I and II, which specify target intake air temperature Tio as a function of target tempered air temperature To, are obtained experimentally. This means that the compressor 22 is operated with its minimum displacement or capacity. This is effective to provide good power economy and thus good fuel economy.

The fact that the compressor 22 operates at its minimum displacement or capacity means that the intake air temperature Ti is very close to the target tempered air temperature To and thus the air mixing door 16 is near its closed position. For this reason, the temperature of the air discharged through the ventilator port 17a is substantially equal to the temperature of the air discharged through the foot port 18a in the bilevel mode. However, it is preferable in view of passenger's comforts that the temperature of the air discharged through the ventilator port 17a be somewhat higher than the temperature of the air discharged through the foot port 18a. For this purpose, the invention is intended to give priority to the passenger's comforts over the power and fuel saving by setting the intake air temperature at a value somewhat lower in the bilevel mode than in the heater or vent mode for the same target tempered air temperature To, as shown in FIG. 17. As a result, the solenoid current Iso is set at a value lower in the bilevel mode than in the heater or vent mode to decrease the intake air temperature Ti. Consequently, the air mixing door 16 opens wider in the bilevel mode than in the heater or vent mode.

Figure 18:
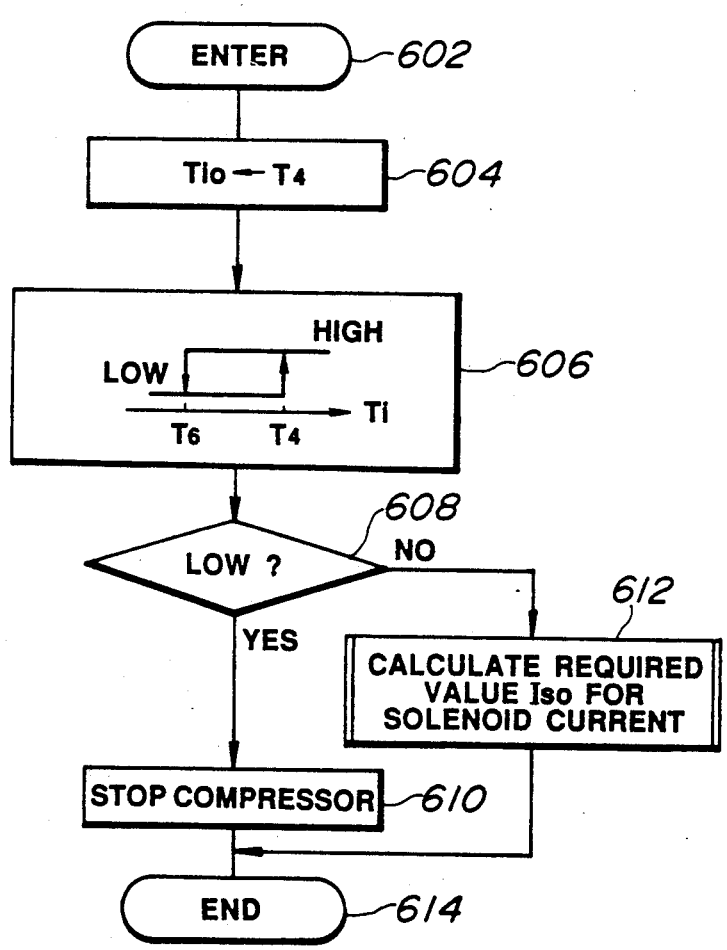
FIG. 18 is a flow diagram of the programming of the digital computer as it is used to operate the compressor in a maximum dehumidification mode.

FIG. 18 is a flow diagram of the programming of the digital computer as it is used to operate the compressor 22 in a maximum dehumidification mode. At the point 602 in FIG. 18, which corresponds to the point 438 of FIG. 9, the computer program is entered. At the point 604 in the program, the target intake air temperature Tio is set at the predetermined value T4 (for example, 3° C.) below which the evaporator 21 may freeze. At the point 606 in the program, the central processing unit 100 determines the range of the intake air temperature. This determination is made by a comparison of the read intake air temperature value Ti hysteretically with the reference value T6 (for example, 1.5° C.) somewhat less than the reference value T4 when the intake air temperature is decreasing and with the reference value T4 when the intake air temperature is increasing. This is effective to eliminate the tendency toward hunting. At the point 608 in the program, a determination is made as to whether or not the intake air temperature is in a low temperature range. If the answer to this question is "yes", then it means that the read intake air temperature value Ti is less than the reference value T6 when the intake air temperature is decreasing or the read intake air temperature value Ti is less than the reference value T4 when the intake air temperature is increasing and the program proceeds to the point 610 where the compressor 22 is stopped. Otherwise, the intake air temperature is in a high temperature range and the program proceeds to the point 612 where the central processing unit 101 calculates a required value Iso for the solenoid current Is applied to the electromagnetic actuator 60 in the same manner as described in connection with FIG. 11. Following this, the program proceeds to the end point 614 which corresponds to the point 218 of FIG. 7.

Figure 19A:
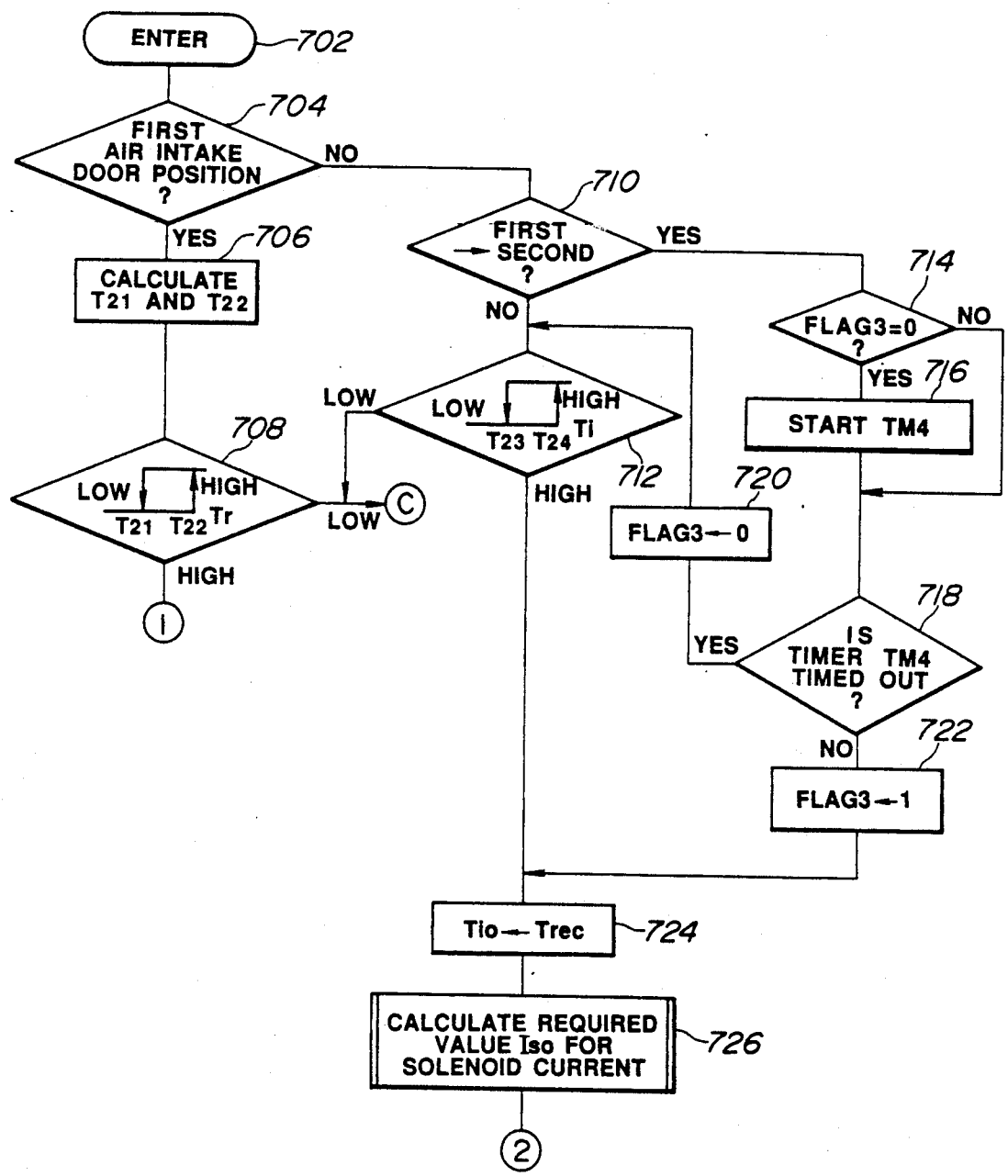

FIGS. 19A and 19B are flow diagrams of the programming of the digital computer as it is used to operate the compressor 22 in a low-temperature demist mode. At the point 702 in FIG. 19, which corresponds to the point 442 of FIG. 9, the computer program is entered. At the point 704 in the program, a determination is made as to whether or not the air intake door 13 is at its first position, indicated by the solid lines of FIG. 1. If the answer to this question is "yes", then it means that the air tempering system introduces air from the atmosphere and the program proceeds to the point 706. Otherwise, the program proceeds to the point 710.

Figure 20:
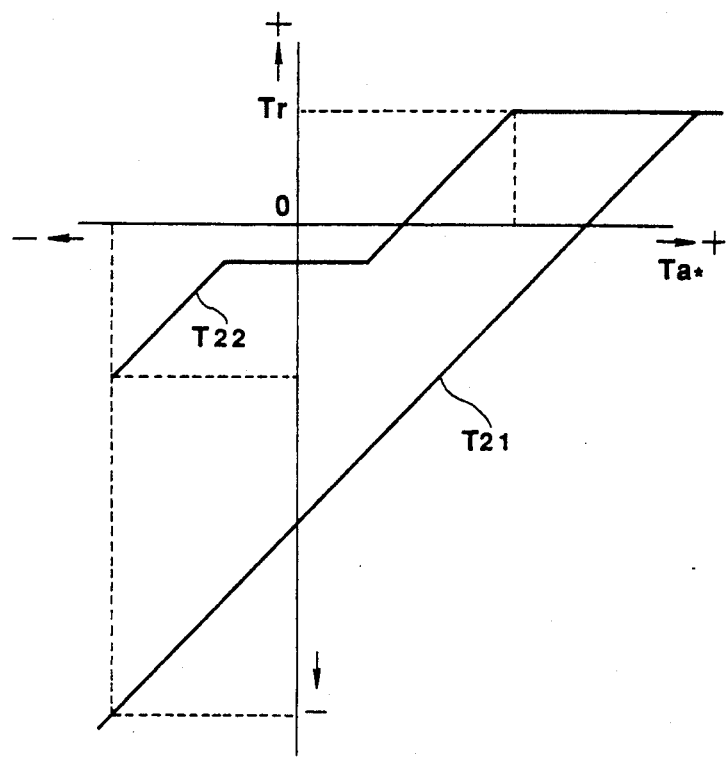
FIG. 20 is a graph showing a relationship used in calculating reference values for refrigerant temperature.

At the point 706 in the program, the central processing unit 101 calculates reference refrigerant temperature values T21 and T22 based upon the corrected ambient temperature value Ta*. This calculation is made from a relationship specifying these reference values T21 and T22 as a function of corrected ambient temperature Ta*, as shown in FIG. 20. At the point 708 in the program, a determination is made as to whether the refrigerant temperature Tr is in a low or high temperature range. This determination is mad by a comparison of the read refrigeration temperature Tr hysteretically with the calculated reference value T21 when the refrigerant temperature is decreasing and with the calculated reference value T22 with the refrigerant temperature is increasing. This is effective to eliminate the tendency toward hunting. If the read refrigerant temperature value Tr is less than the reference value T21 when the refrigerant temperature is decreasing or the read refrigerant temperature value Tr is less than the reference value T22 when the refrigerant temperature is increasing, then the refrigerant temperature is in a low temperature range and the program proceeds to the point 406 of FIG. 9 where the compressor 22 is stopped. If the read refrigerant temperature value Tr exceeds the reference value T21 when the refrigerant temperature is decreasing or the read refrigerant temperature value Tr exceeds the reference value T22 when the refrigerant temperature is increasing, then the refrigerant temperature is in a high temperature range and the program proceeds to the point 728 of FIG. 19B.

At the point 728 in the program, the central processing unit 101 sets a first target refrigerant temperature value Tro1 at (Ta*+T8) which indicates the corrected ambient temperature Ta* plus a predetermined value T8 (for example, 16° C.) and a second target refrigerant temperature value Tro2 at (Ta*−T9) which indicates the corrected ambient temperature Ta* minus a predetermined value T9 (for example, 4° C.). The central processing unit 101 also sets a second timer TM2 at a time t2 (for example, 3 minutes) and sets a third timer TM3 at a time t3 (for example, 2 minutes).

At the point 730 in the program, a determination is made as to whether or not a first flag FLAG1 is cleared. If the answer to this question is "yes", then the program proceeds to the point 732. Otherwise, the program proceeds to the point 736. At the point 732, a determination is made as to whether or not a second flag FLAG2 is cleared. If the answer to this question is "yes", then the program proceeds to the point 734. Otherwise, the program proceeds to the point 748.

At the point 734 in the program, the second timer TM2 is started. At the point 736 in the program, the second value Tro2 is selected for the target refrigerant temperature Tro. At the point 738, the central processing unit 101 calculates a required value Iso for the solenoid current Is applied to the electromagnetic actuator 60 based on a difference of the selected target refrigerant temperature value Tro from the read refrigerant temperature Tr. This calculation will be described further in connection with FIG. 22.

At the point 740 in the program, a determination is made as to whether or not the second timer TM2 is timed out; that is, the set time t2 has elapsed. If the answer to this question is "no", then the program proceeds to the point 742 where the first flag FLAG1 is set and then to the end point 758. If the second timer TM2 is timed out, then the program proceeds from the point 740 to the point 744 where the first flag FLAG1 is cleared.

At the point 746 in the program, the third timer TM3 is started. At the point 748 in the program, the first value Tro1 is selected for the target refrigerant temperature Tro. At the point 750, the central processing unit 101 calculates a required value Iso for the solenoid current Is applied to the electromagnetic actuator 60 based on a difference of the selected target refrigerant temperature value Tro from the read refrigerant temperature Tr. This calculation will be described further in connection with FIG. 22.

At the pont 752 in the program, a determination is made as to whether or not the third timer TM3 is timed out; that is, the set time t3 has elapsed. If the answer to this question is "no", then the program proceeds to the point 754 where the second flag FLAG2 is set and then to the end point 758. If the third timer TM3 is timed out, then the program proceeds from the point 752 to the point 756 where the second flag FLAG2 is cleared. Following this, the program proceeds to the end point 758 which corresponds to the point 218 of FIG. 7.

Figure 21:
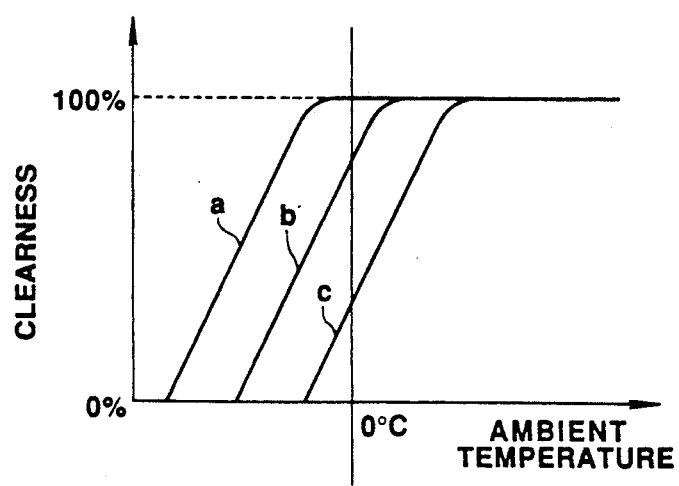
FIG. 21 is a graph showing the degree of clearness of windshield glass with respect to ambient temperature.
Figure 22:
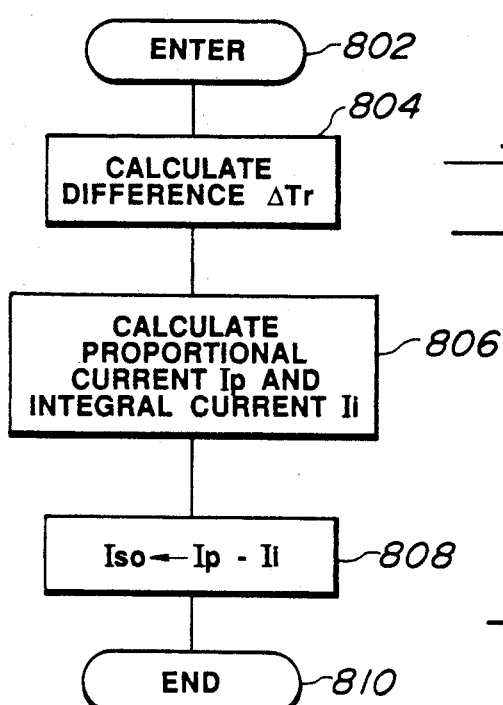
FIG. 22 is a flow diagram of the programming of the digital computer as it is used to calculate a required value for solenoid current.
Figure 24:
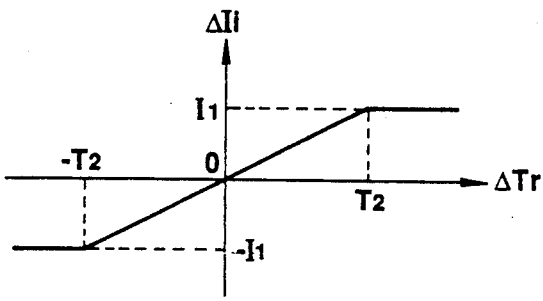
FIGS. 23 and 24 are graphs showing relationships used in calculating the required solenoid current value.
Figure 23:
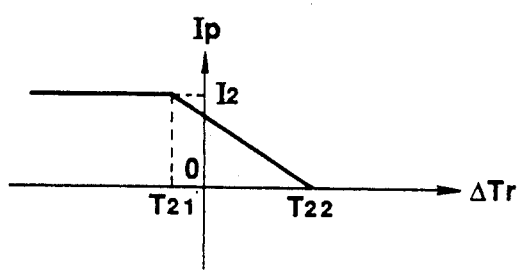

FIG. 22 is a flow diagram of the programming of the digital computer as it is used to calculate a required value Iso for the solenoid current Is applied to the electromagnetic actuator 60. At the point 802 in FIG. 21, which corresponds to the point 738 or 750 of FIG. 19B, the computer program is entered. At the point 804 in the program, the central processing unit 101 calculates a difference ΔTr of the selected target refrigerant temperature value Tro from the read refrigerant temperature value Tr. At the point 806 in the program, the central processing unit 101 calculates a proportional current Ip based on the calculated difference ΔTr. The proportional current Ip is determined from a relationship that specifies the proportional current Ip as a function of the calculated difference ΔTr, as shown in FIG. 23. In FIG. 23, the character T21 indicates a temperature difference (for example, −5° C.), the character T22 indicates a temperature difference (for example, 15° C.), and the character I2 indicates a proportional current (for example, 0.8 amperes). This relationship may be obtained experimentally. The central processing unit 101 also calculates an integral current Ii by adding an integral current difference ΔIi to the last integral current Ii. The integral current difference ΔIi is determined from a relationship that specifies this difference ΔIi as a function of the calculated difference ΔTr, as shown in FIG. 24. In FIG. 24, the character T2 indicates a temperature difference (for example, 6° C.) and the character I1 indicates an integral current difference (for example, 0.98 milliamperes). This relationship may be obtained experimentally.

At the point 808 in the program, the central processing unit 101 calculates a required solenoid current value Iso by subtracting the calculated integral current Ii from the calculated proportional current Ip. Following this, the program proceeds to the end point 810 which corresponds to the point 740 or 752 of FIG. 19B.

Figure 25:
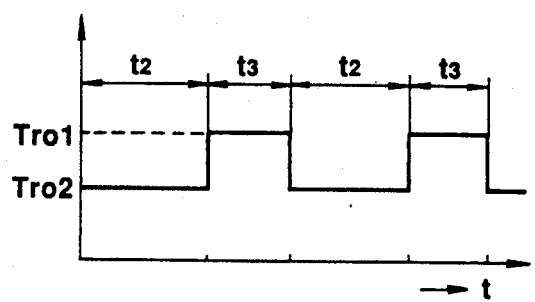
FIG. 25 is a graph used in explaining the operation of the compressor during the low-temperature demist mode.

During the low-temperature demist mode of operation of the compressor 22 when the computer program exceeds through the points 728 to 758, the required solenoid current value Iso is calculated based on one of the first and second target refrigerant temperature values Tro1 and Tro2 selected alternatively with the lapse of time, as shown in FIG. 25 where the time t2 corresponds to the time required for the computer program to proceed from the point 734 to the point 740 and the time t3 corresponds to the time required for the computer program to proceed from the point 746 to the point 752. As a result, the compressor 22 operates in a pulsated fashion during such a low-temperature demist mode. This is effective to improve the lubricating ability so as to keep the compressor 22 from seizing at small refrigerant flow rates.

At the point 710 of FIG. 19A, it is just after the air intake door 13 is changed from its first position to the second position. If the answer to this question is "yes", then the program proceeds to the point 714. Otherwise, the program proceeds to the point 712.

At the point 714 in the program, a determination is made as to whether or not a third flag FLAG3 is cleared. If the answer to this question is "yes", then the program proceeds to the point 716 where a fourth timer TM4 is started and then to the point 718. Otherwise, the program jumps the point 716 to the point 718.

At the point 718 in the program, a determination is made as to whether or not the fourth timer TM4 is timed out; that is, a time t4 set for the fourth timer TM4 has elapsed. If the answer to this question is "yes", then the program proceeds to the point 720 where the third flag FLAG3 is cleared and then to the point 712. Otherwise, the program proceeds to the point 722 where the third flag FLAG3 is set and then to the point 724.

At the point 712 in the program, a determination is made as to whether the read intake air temperature Ti is in a low or high temperature range. This determination is made by a comparison of the read intake air temperature value Ti hysteretically with a reference value T23 when the intake air temperature is decreasing and with a reference value T24 somewhat greater than the reference value T23 when the intake air temperature is increasing. This is effective to eliminate the tendency toward hunting. If the read intake air temperature value Ti is less than the reference value T23 when the intake air temperature is decreasing or the read intake air temperature value Ti is less than the reference value T24 when the intake air temperature is increasing, then the intake air temperature is in a low temperature range and the program proceeds to the point 406 of FIG. 9 where the compressor 22 is stopped. Otherwise, the intake air temperature is in a high temperature range and the program proceeds to the point 724 where a predetermined value Trec is set for the target intake air temperature value Tio. The predetermined value Trec is greater than 0° C. and less than the reference value T4 (for example, 3° C.) below which the evaporator 21 may freeze.

At the point 726 in the program, the central processing unit 101 calculates a required value Iso for the solenoid current Is applied to the electromagnetic actuator 60 based upon a difference of the target intake air temperature value Tio (in this case Trec) from the read intake air temperature value Ti as described in connection with FIG. 11.

The compressor 22 is stopped in order to keep the the evaporator 21 from freezing when the refrigerant temperature Tr decreases below a reference value T21 during the low-temperature demist mode of operation of the compressor 22. The reference value T21, which is determined as a function of ambient temperature as shown in FIG. 20, is low when the ambient temperature is in the low range where the low-temperature demist mode is selected. This is effective to avoid an unnecessary compressor stop and provide a sufficient degree of humidification. When the ambient temperature is relatively high, the reference refrigerant temperature value T21 is relatively high. This is effective to stop the compressor 22 to keep the evaporator 21 from freezing before it provides an excessive refrigerant capacity.

If the compressor 22 is operated based on a difference of the target refrigerant temperature value Tro from the read refrigerant temperature value Tr when the air intake door 13 is at the second position introducing air into the duct 11 from the passenger compartment, the refrigerant temperature sensor 125 will indicate a refrigerant temperature higher than its correct value due to the worm air in the passenger compartment. As a result, the compressor 22 would provide an excessive refrigerating capacity causing the evaporator 21 to freeze. In order to avoid this difficulty and suppress the influence of the worm air on the dehumidification performance, the compressor 22 is controlled based on a difference between the read intake air temperature value Ti and the target intake air temperature value Tio during the low-temperature demist mode with the air intake door 13 being at the second position introducing air from the passenger compartment into the duct 11.

FIG. 21 shows the degree of clearness of the windshield glass with respect to ambient temperature. The curve a relates to the case where the compressor 22 is operating with the air intake door 13 being at the first position introducing air from the atmosphere into the duct 11. The curve c relates to the case where the compressor 22 is stopped with the air intake door 13 being at the second position introducing air from the passenger compartment into the duct 11. As can be seen from FIG. 21, the degree of clearness of the windshield glass is smaller when the compressor 22 is stopped with the air intake door 13 being at the second position than when the compressor 22 is operating with the air intake door 13 being at the first position. This is true particularly when the ambient temperature is below 0° C.

In this embodiment, the compressor 22 is stopped when the intake air temperature Ti decreases below the reference value T23 (the point 712 of FIG. 19A) with the air intake door 13 being at the second position. If the compressor 22 is stopped just after the air intake door 13 is changed from the first position to the second position, however, the windshield glass will correct moisture rapidly. For this reason, the compressor 22 is operated for a predetermined time just after the air intake door 13 is changed from the first position to the second position even when the intake air temperature Ti is less than the reference value. This is effective to avoid rapid correction of moisture on the windshield glass.

What is claimed is:

1. An air tempering apparatus for use in an automotive vehicle having a duct through which air is directed into a passenger compartment, comprising:
   means for introducing air into the duct selectively from one of the atmosphere and the passenger compartment;
   air chilling means including an evaporator provided in the duct and a compressor having a displacement variable for supplying a controlled amount of refrigerant to the evaporator for chilling the air in the duct;
   first sensor means provided in the duct downstream of the evaporator for sensing chilled air temperature;
   second sensor means for sensing refrigerant temperature;
   third sensor means for producing a first signal when air is introduced into the duct from the atmosphere and a second signal when air is introduced into the duct from the passenger compartment; and
   a control unit coupled to the first, second and third sensor means, the control unit including means responsive to the first signal for controlling the displacement of the compressor to bring the refrigerant temperature to a target value, the control unit including means responsive to the second signal for controlling the displacement of the compressor to bring the chilled air temperature to a target value.

2. The air tempering apparatus as claimed in claim 1, wherein the control unit includes means responsive to the second signal for stopping the compressor when the sensed chilled air temperature is less than a predetermined value, and means for operating the compressor for a predetermined period of time regardless of the sensed chilled air temperature just after a change from the first signal to the second signal.

3. The air tempering apparatus as claimed in claim 2, wherein the control unit includes means responsive to the first signal for stopping the compressor when the sensed refrigerant temperature is less than a predetermined value.

* * * * *